US012352040B2

(12) United States Patent
Geoffrion et al.

(10) Patent No.: US 12,352,040 B2
(45) Date of Patent: Jul. 8, 2025

(54) BARRIER SYSTEMS FOR BUILDING STRUCTURES AND RELATED METHODS

(71) Applicant: Siplast, Inc., Irving, TX (US)

(72) Inventors: Luke Geoffrion, Malvern, AR (US); Benjamin Meyer, Irving, TX (US); Chris Fetterman, Beaufort, SC (US)

(73) Assignee: Siplast, Inc., Irving, TX (US)

( * ) Notice: Subject to any disclaimer, the term of this patent is extended or adjusted under 35 U.S.C. 154(b) by 0 days.

(21) Appl. No.: 18/736,336

(22) Filed: Jun. 6, 2024

(65) Prior Publication Data
US 2024/0410164 A1 Dec. 12, 2024

Related U.S. Application Data

(60) Provisional application No. 63/569,949, filed on Mar. 26, 2024, provisional application No. 63/589,862, filed on Oct. 12, 2023, provisional application No. 63/507,031, filed on Jun. 8, 2023.

(51) Int. Cl.
*E04B 1/66* (2006.01)
*B29C 65/48* (2006.01)
*B29C 65/52* (2006.01)
*E04B 1/68* (2006.01)

(52) U.S. Cl.
CPC ............ *E04B 1/665* (2013.01); *B29C 65/485* (2013.01); *B29C 65/522* (2013.01); *E04B 1/6801* (2013.01)

(58) Field of Classification Search
CPC ..... E04B 1/665; E04B 1/6801; B29C 65/485; B29C 65/522
See application file for complete search history.

(56) References Cited

U.S. PATENT DOCUMENTS

| 4,520,051 A | 5/1985 | Harrison |
| 4,668,315 A | 5/1987 | Brady et al. |
| 5,356,980 A | 10/1994 | Feder et al. |
| 5,595,801 A * | 1/1997 | Fahy .................. H05K 9/0015 428/394 |
| 5,733,947 A | 3/1998 | Loiselle et al. |

(Continued)

FOREIGN PATENT DOCUMENTS

| CA | 2532602 C | 11/2013 |
| CA | 3067607 A1 | 7/2020 |

(Continued)

OTHER PUBLICATIONS

Carey et al., "Spray-Coating Thin Films on Three-Dimensional Surfaces for a Semitransparent Capacitive-Touch Device," ACS Appl. Mater. Interfaces 2018, 10, 19948-19956.

*Primary Examiner* — Babajide A Demuren
(74) *Attorney, Agent, or Firm* — GREENBERG TRAURIG, LLP

(57) ABSTRACT

Barrier systems for building structures are provided. A system comprises a building structure, a first membrane, a second membrane, and a cured barrier membrane spray film. The first membrane and the second membrane are located on the building structure, such that the second membrane partially overlaps the first membrane in an overlapping portion. The cured barrier membrane spray film is located between the first membrane and the second membrane in the overlapping portion. Related systems, related aerosilizable compositions, and related methods are provided.

19 Claims, 7 Drawing Sheets

(56) References Cited

U.S. PATENT DOCUMENTS

Figure 2:
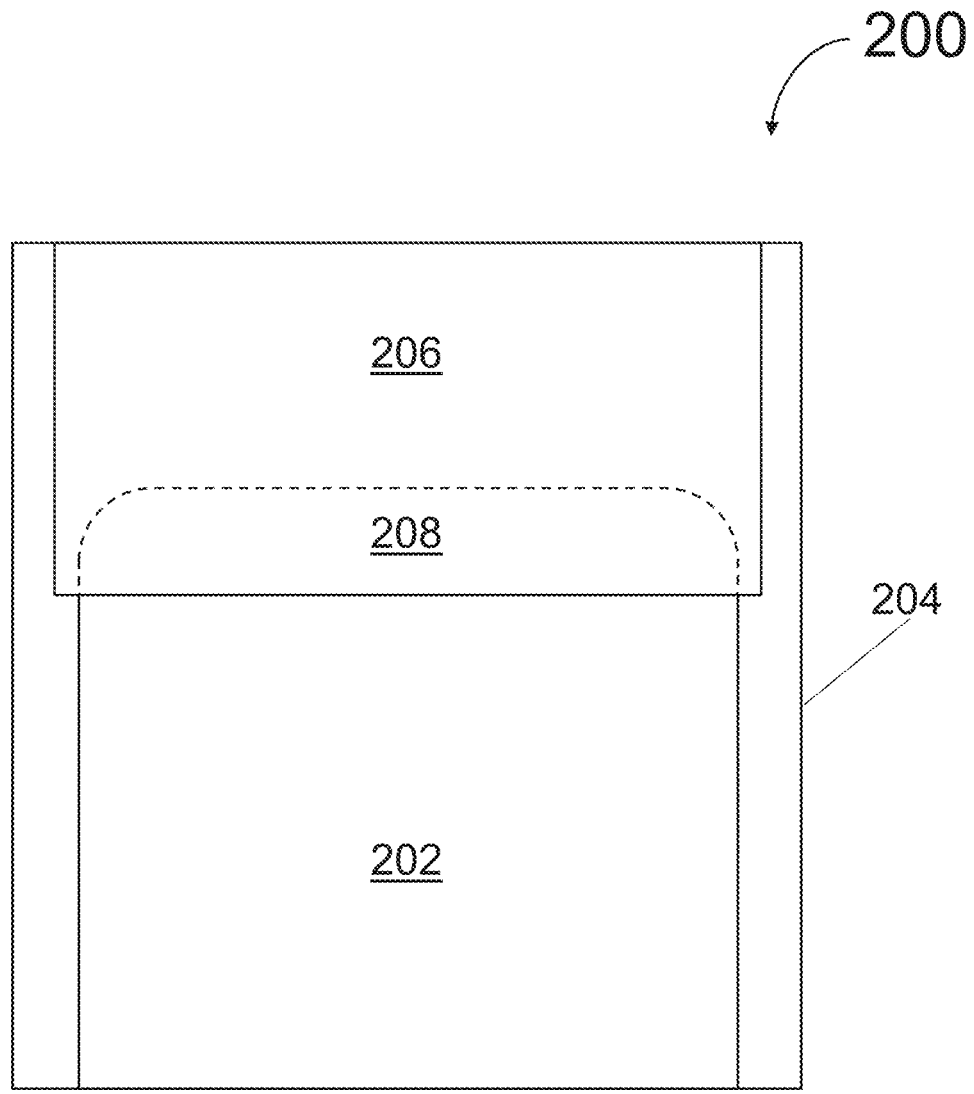

| Patent No. | Date | Inventor |
|---|---|---|
| 5,763,014 A | 6/1998 | Pickett |
| 5,849,133 A | 12/1998 | Senderling et al. |
| 5,899,026 A | 5/1999 | Williams et al. |
| 5,979,131 A | 11/1999 | Remmele et al. |
| 6,075,078 A | 6/2000 | Braud et al. |
| 6,401,401 B1 | 6/2002 | Williams |
| 6,437,071 B1 | 8/2002 | Odaka et al. |
| 6,613,816 B2 | 9/2003 | Mahdi et al. |
| 6,868,643 B1 | 3/2005 | Williams |
| 6,887,964 B2 | 5/2005 | Frisch et al. |
| 7,190,058 B2 * | 3/2007 | Park .................. H01L 21/6836 156/247 |
| 7,317,051 B2 | 1/2008 | Georgeau et al. |
| 7,365,145 B2 | 4/2008 | Yang et al. |
| 7,410,703 B2 | 8/2008 | Giraud et al. |
| 7,510,768 B2 | 3/2009 | Crawford et al. |
| 7,605,203 B2 | 10/2009 | Feng et al. |
| 7,662,221 B2 | 2/2010 | Fay |
| 7,705,056 B1 | 4/2010 | Carnahan |
| 7,767,308 B2 | 8/2010 | Georgeau et al. |
| 7,807,752 B2 | 10/2010 | Masutani et al. |
| 8,022,149 B2 | 9/2011 | Udea et al. |
| 8,092,858 B2 | 1/2012 | Smith |
| 8,142,856 B2 | 3/2012 | Chevalier |
| 8,178,160 B2 | 5/2012 | Ferencz et al. |
| 8,344,087 B2 | 1/2013 | Maton et al. |
| 8,362,124 B2 | 1/2013 | Rajaraman et al. |
| 8,372,515 B2 | 2/2013 | Byrne et al. |
| 8,551,611 B2 | 10/2013 | Pichler |
| 8,596,555 B2 | 12/2013 | Thompson et al. |
| 8,733,054 B2 | 5/2014 | Schroeer et al. |
| 8,735,524 B2 | 5/2014 | Lai et al. |
| 8,846,822 B2 | 9/2014 | Yano et al. |
| 8,937,141 B2 | 1/2015 | Sumi et al. |
| 8,974,627 B2 | 3/2015 | Schubert et al. |
| 8,993,706 B2 | 3/2015 | Schubert et al. |
| 9,102,799 B2 | 8/2015 | Bloomfield |
| 9,156,981 B2 | 10/2015 | Lim et al. |
| 9,169,393 B2 | 10/2015 | Rungta et al. |
| 9,228,112 B2 | 1/2016 | Gorodisher et al. |
| 9,243,152 B2 | 1/2016 | Iyer et al. |
| 9,315,688 B2 | 4/2016 | Yanan et al. |
| 9,328,259 B1 | 5/2016 | Andrews |
| 9,334,433 B2 | 5/2016 | Oertli et al. |
| 9,458,319 B2 | 10/2016 | Maliverney et al. |
| 9,499,677 B2 | 11/2016 | Dukes et al. |
| 9,523,022 B2 | 12/2016 | Johnson et al. |
| 9,701,868 B2 | 7/2017 | Iezzi |
| 9,745,489 B2 | 8/2017 | Swift et al. |
| 9,828,523 B2 | 11/2017 | Johnson et al. |
| 9,850,165 B2 | 12/2017 | Dandekar et al. |
| 9,882,082 B2 | 1/2018 | Kreutz et al. |
| 9,896,601 B2 | 2/2018 | Setzke |
| 9,914,842 B2 | 3/2018 | Bauer et al. |
| 9,919,972 B2 | 3/2018 | Land et al. |
| 9,987,120 B2 | 6/2018 | Soletti et al. |
| 9,993,786 B2 | 6/2018 | Roland et al. |
| 10,087,278 B2 | 10/2018 | Lobert et al. |
| 10,100,068 B2 | 10/2018 | Burckhardt et al. |
| 10,138,394 B2 | 11/2018 | Huda et al. |
| 10,167,627 B2 | 1/2019 | Peet et al. |
| 10,266,773 B2 | 4/2019 | Brooks et al. |
| 10,269,477 B2 | 4/2019 | Matsutomi et al. |
| 10,301,422 B2 | 5/2019 | Kramer et al. |
| 10,308,552 B2 | 6/2019 | Dubey et al. |
| 10,308,771 B2 | 6/2019 | Gao et al. |
| 10,351,690 B2 | 7/2019 | Bardin et al. |
| 10,370,563 B2 | 8/2019 | Tao et al. |
| 10,392,480 B2 | 8/2019 | Cannas et al. |
| 10,400,134 B2 | 9/2019 | Tatley et al. |
| 10,414,875 B2 | 9/2019 | Cannas et al. |
| 10,428,252 B2 | 10/2019 | Burckhardt et al. |
| 10,508,435 B2 | 12/2019 | Peet et al. |
| 10,550,286 B2 | 2/2020 | West |
| 10,550,575 B2 | 2/2020 | Tang et al. |
| 10,570,243 B2 | 2/2020 | Lim et al. |
| 10,577,801 B2 | 3/2020 | Tselepis |
| 10,661,503 B2 | 5/2020 | Monroe et al. |
| 10,717,821 B2 | 7/2020 | Dei Santi et al. |
| 10,745,523 B2 | 8/2020 | Scheim et al. |
| 10,759,946 B2 | 9/2020 | Haberle et al. |
| 10,800,885 B2 | 10/2020 | Fiedel et al. |
| 10,829,585 B2 | 11/2020 | Becquet et al. |
| 10,867,720 B2 | 12/2020 | Hayes et al. |
| 10,889,682 B2 | 1/2021 | Damke et al. |
| 10,898,606 B2 | 1/2021 | Stein et al. |
| 10,899,926 B2 | 1/2021 | Kasemi et al. |
| 10,920,078 B2 | 2/2021 | Grasmann et al. |
| 10,995,074 B2 | 5/2021 | Cannas et al. |
| 11,001,734 B2 | 5/2021 | Young et al. |
| 11,021,611 B2 | 6/2021 | Young |
| 11,097,259 B2 | 8/2021 | Cannas et al. |
| 11,104,762 B2 | 8/2021 | Hayes et al. |
| 11,186,985 B2 | 11/2021 | Bess et al. |
| 11,242,463 B2 | 2/2022 | Virtanen et al. |
| 11,292,771 B2 | 4/2022 | Cannas et al. |
| 11,383,886 B2 | 7/2022 | Cavallin et al. |
| 11,434,372 B2 | 9/2022 | Verosky et al. |
| 11,530,341 B1 | 12/2022 | de Houwer et al. |
| 11,591,798 B2 | 2/2023 | Geyer et al. |
| 11,779,945 B2 | 10/2023 | Thompson et al. |
| 11,827,813 B2 | 11/2023 | Scanish |
| 2001/0004490 A1 | 6/2001 | Wait |
| 2004/0018354 A1 * | 1/2004 | May .................... B32B 3/02 428/40.1 |
| 2004/0188016 A1 | 9/2004 | Mahdi et al. |
| 2004/0221940 A1 * | 11/2004 | Harte .................... C09J 7/22 156/247 |
| 2004/0228999 A1 * | 11/2004 | Rivest .................. E06B 1/62 428/40.1 |
| 2006/0035048 A1 | 2/2006 | Swann |
| 2007/0160766 A1 | 7/2007 | Copland |
| 2008/0153970 A1 | 6/2008 | Salazar |
| 2008/0153971 A1 | 6/2008 | Salazar |
| 2009/0137711 A1 | 5/2009 | Georgeau et al. |
| 2009/0220720 A1 * | 9/2009 | Mohseen ................ E04D 1/29 156/60 |
| 2010/0247929 A1 | 9/2010 | Oertli et al. |
| 2010/0307087 A1 * | 12/2010 | Zoellner ............... E04D 12/002 52/309.3 |
| 2011/0082356 A1 * | 4/2011 | Yang .................... C12Q 1/006 524/502 |
| 2011/0152654 A1 * | 6/2011 | Wang ............... G01N 33/54393 600/347 |
| 2012/0107515 A1 | 5/2012 | Johnston |
| 2013/0102738 A1 | 4/2013 | Stanjek et al. |
| 2015/0218334 A1 | 8/2015 | Halbach et al. |
| 2019/0085553 A1 | 3/2019 | Peet et al. |
| 2020/0181911 A1 | 6/2020 | Tselepis |
| 2020/0270866 A1 | 8/2020 | Yancey et al. |
| 2020/0339759 A1 | 10/2020 | Tepe et al. |
| 2021/0207005 A1 | 7/2021 | Seabaugh et al. |
| 2022/0064457 A1 | 3/2022 | Betzig et al. |
| 2022/0267654 A1 | 8/2022 | Zheng et al. |
| 2022/0307263 A1 | 9/2022 | Chich et al. |

FOREIGN PATENT DOCUMENTS

| | | |
|---|---|---|
| CN | 104449439 A | 3/2015 |
| CN | 113980609 A | 1/2022 |
| EP | 1650261 A1 | 4/2006 |
| EP | 1987108 B1 | 9/2009 |
| EP | 2119745 A1 | 11/2009 |
| EP | 2072577 B1 | 8/2010 |
| EP | 2046909 B1 | 10/2011 |
| GB | 2554874 A | 4/2018 |
| WO | 2020176861 A1 | 9/2020 |
| WO | 2021158579 A1 | 8/2021 |
| WO | 2021228184 A1 | 11/2021 |
| WO | 2022051492 A1 | 3/2022 |
| WO | 2023114489 A1 | 6/2023 |

* cited by examiner

```
                                    ┌─── 100
                                    ▼

┌──────────────────────────────────────────┐ ── 102
│        OBTAINING A FIRST MEMBRANE        │
└──────────────────────────────────────────┘
                    │
                    ▼
┌──────────────────────────────────────────┐ ── 104
│       OBTAINING A SECOND MEMBRANE        │
└──────────────────────────────────────────┘
                    │
                    ▼
┌──────────────────────────────────────────┐ ── 106
│   OBTAINING AN AEROSILIZABLE COMPOSITION │
└──────────────────────────────────────────┘
                    │
                    ▼
┌──────────────────────────────────────────┐ ── 108
│ INSTALLING THE FIRST MEMBRANE ON A BUILDING │
│                 STRUCTURE                │
│          (CONTINUED TO FIG. 1B)          │
└──────────────────────────────────────────┘
```

FIG. 1A

100

110 — (CONTINUED FROM FIG. 1A) SPRAYING THE AEROSILIZABLE COMPOSITION ONTO AT LEAST A PORTION OF THE FIRST MEMBRANE, SO AS TO FORM A BARRIER MEMBRANE SPRAY FILM

112 — INSTALLING THE SECOND MEMBRANE ON THE BUILDING STRUCTURE

114 — CURING THE BARRIER MEMBRANE SPRAY FILM

FIG. 1B

BARRIER SYSTEMS FOR BUILDING STRUCTURES AND RELATED METHODS

CROSS-REFERENCE TO RELATED APPLICATIONS

This application claims priority to U.S. Provisional Patent Application No. 63/507,031, filed Jun. 8, 2023, and titled "BARRIER SYSTEMS FOR BUILDING STRUCTURES AND RELATED METHODS"; U.S. Provisional Patent Application No. 63/589,862, filed Oct. 12, 2023, and titled "BARRIER SYSTEMS FOR BUILDING STRUCTURES AND RELATED METHODS"; and U.S. Provisional Patent Application No. 63/569,949, filed Mar. 26, 2024, and titled "AEROSILIZABLE COMPOSITIONS FOR BUILDING APPLICATIONS AND RELATED SYSTEMS AND RELATED METHODS"; the disclosures of which applications are hereby incorporated herein by reference in their entirety.

FIELD

This disclosure generally relates to barrier systems for building structures and related methods.

BACKGROUND

Building envelope systems can require installation of various components. Some components of building envelopes are constructed of chemically incompatible materials. These components, when installed as part of a building envelope system, are not effective barriers.

SUMMARY

Some embodiments relate to a system. In some embodiments, the system comprises a building structure. In some embodiments, the system comprises a first membrane. In some embodiments, the system comprises a second membrane. In some embodiments, the first membrane and the second membrane are located on the building structure, such that the second membrane partially overlaps the first membrane in an overlapping portion. In some embodiments, the system comprises a cured barrier membrane spray film. In some embodiments, the cured barrier membrane spray film is located between the first membrane and the second membrane in the overlapping portion. In some embodiments, the cured barrier membrane spray film comprises at least one of a crosslinked silyl-terminated polymer, a crosslinked polysiloxane, or any combination thereof.

In some embodiments, the building structure is at least one of a wall assembly, a board, a siding, a sheet good, a panel, or any combination thereof.

In some embodiments, the first membrane is a liquid applied membrane.

In some embodiments, the liquid applied membrane comprises at least one of a polysiloxane, a polyurea, a polyurethane, a silyl-terminated polymer, an epoxy, an acrylic, a polyvinylidene fluoride, a polyvinylidene difluoride, any precursor thereof, any copolymer thereof, or any combination thereof.

In some embodiments, the second membrane is different from the first membrane.

In some embodiments, the second membrane comprises at least one of a thermoplastic polyolefin (TPO), a polyvinyl chloride (PVC), an ethylene-propylene diene monomer (EPDM), a silyl-terminated polymer (STP), a polysiloxane, or any combination thereof.

In some embodiments, the cured barrier membrane spray film contacts, in the overlapping portion, the first membrane or the second membrane.

In some embodiments, the cured barrier membrane spray film contacts, in the overlapping portion, the first membrane and the second membrane.

In some embodiments, a thickness of the cured barrier membrane spray film is less than a thickness of the first membrane.

In some embodiments, the cured barrier membrane spray film forms a watertight seal located between the first membrane and the second membrane.

Some embodiments relate to a method of installation. In some embodiments, the method of installation comprises obtaining a first membrane. In some embodiments, the method of installation comprises obtaining a second membrane. In some embodiments, the method of installation comprises obtaining an aerosilizable composition. In some embodiments, the method of installation comprises installing the first membrane on a building structure. In some embodiments, the method of installation comprises spraying the aerosilizable composition onto at least a portion of the first membrane, so as to form a barrier membrane spray film. In some embodiments, the method of installation comprises installing the second membrane on the building structure, such that the second membrane partially overlaps the first membrane in an overlapping portion. In some embodiments, the method of installation comprises installing the second membrane on the building structure, such that the barrier membrane spray film is located between the first membrane and the second membrane in the overlapping portion. In some embodiments, the method of installation comprises curing the barrier membrane spray film, so as to form a seal between the first membrane and the second membrane.

In some embodiments, the first membrane is a liquid applied membrane composition. In some embodiments, installing the first membrane on the building structure comprises applying the liquid applied membrane composition to the building structure; and curing the liquid applied membrane composition, so as to form a liquid applied membrane.

In some embodiments, applying the liquid applied membrane composition further comprises spreading the liquid applied membrane composition onto the building structure.

In some embodiments, curing the liquid applied membrane composition comprises at least one of exposing the liquid applied membrane composition to ambient conditions, heating the liquid applied membrane composition to a temperature, exposing the liquid applied membrane composition to water moisture, or any combination thereof, sufficient to at least partially cure the liquid applied membrane composition.

In some embodiments, spraying the aerosilizable composition comprises dispersing the aerosilizable composition from an aerosol container onto the first membrane.

In some embodiments, the barrier membrane spray film is partially cured prior to installing the second membrane.

In some embodiments, the aerosilizable composition comprises at least one polymer, a catalyst, and at least one propellant.

In some embodiments, the aerosilizable composition comprises 10% to 90% by weight of at least one propellant based on a total weight of the aerosilizable composition. In some embodiments, the aerosilizable composition comprises 10% to 70% by weight of at least one polymer based on the total weight of the aerosilizable composition. In some embodiments, the at least one polymer comprises at least one of a silyl-terminated polymer, a polysiloxane, any precursor thereof, or any combination thereof. In some embodiments, 0.1% to 10% by weight of a catalyst based on the total weight of the aerosilizable composition.

In some embodiments, installing the second membrane on the building structure comprises adhering the second membrane to the building structure.

In some embodiments, installing the second membrane on the building structure comprises mechanically fastening the second membrane to the building structure.

BRIEF DESCRIPTION OF THE DRAWINGS

Reference is made to the drawings that form a part of this disclosure, and which illustrate embodiments in which the materials and methods described herein can be practiced.

FIGS. 1A-1B are a flowchart of a method of installation, according to some embodiments.

FIG. 2 is a schematic diagram of a plan view of a barrier system, according to some embodiments.

FIG. 3 is a schematic diagram of a cross-sectional view of a barrier system, according to some embodiments.

FIG. 4 is a flowchart of a method of installation, according to some embodiments.

FIG. 5 is a flowchart of a method of installation, according to some embodiments.

FIG. 6 is a flowchart of a method of installation, according to some embodiments.

DETAILED DESCRIPTION

FIGS. 1A-1B are a flowchart of a method of installation 100, according to some embodiments. As shown in FIGS. 1A-1B, in some embodiments, the method of installation 100 comprises one or more of the following steps: obtaining 102 a first membrane; obtaining 104 a second membrane; obtaining 106 an aerosilizable composition; installing 108 the first membrane on a building structure; spraying 110 the aerosilizable composition onto at least a portion of the first membrane, so as to form a barrier membrane spray film; installing 112 the second membrane on the building structure; and curing 114 the barrier membrane spray film.

In some embodiments, the method of installation 100 comprises obtaining 102 a first membrane.

In some embodiments, obtaining 102 comprises obtaining a liquid applied membrane composition, wherein the liquid applied membrane composition is a single-part formulation. In some embodiments, obtaining 102 comprises obtaining a liquid applied membrane composition, wherein the liquid applied membrane composition is a two-part formulation. In some embodiments, the two-part formulation comprises a first part and a second part. In some embodiments, obtaining 102 a liquid applied membrane composition comprises mixing the first part of the formulation and the second part of the formulation, so as to form the liquid applied membrane composition. In some embodiments, the first part of the formulation comprises a base formulation. In some embodiments, the base formulation comprises at least one of at least one polymer, at least one filler, or any combination thereof. In some embodiments, the second part of the formulation comprises an activator formulation. In some embodiments, the activator formulation comprises at least one of at least one flocculant, at least one inorganic metal salt, at least one dessicant, at least one liquid carrier, or any combination thereof. In some embodiments, the at least one inorganic metal salt comprises at least aluminum sulfate. In some embodiments, the first membrane is at least one of a liquid applied membrane composition, a liquid applied membrane, or any combination thereof.

In some embodiments, the first membrane comprises at least one polymer. In some embodiments, the at least one polymer comprises at least one of a polysiloxane, a polyurea, a polyurethane, a silyl-terminated polymer (e.g., a silyl-terminated polyester, a silyl-terminated polyurethane, a silyl-terminated polyolefin, etc.), an epoxy (e.g., an epoxy resin), an acrylic (e.g., an acrylic resin, a polyacrylic resin, a polymethylmethacrylate, etc.), a polyvinylidene fluoride, a polyvinylidene difluoride, any precursor thereof, any copolymer thereof, or any combination thereof. In some embodiments, the acrylic comprises at least one of poly(methyl methacrylate) (PMMA), polyacrylonitrile (PAN), poly(hydroxyethyl methacrylate), poly(glyceryl methacrylate), poly(ethyl methacrylate), poly(isobutyl methacrylate), poly(acrylic acid), poly(α-methyl cyanoacrylate), an acrylic latex resin, acrylic-polyvinyl chloride (acrylic-PVC), acrylic-styrene, isobornyl methacrylate, isobornyl acrylate, ethyl methacrylate, isobutyl methacrylate, n-butyl methacrylate, ethyl acrylate, n-butyl acrylate, 2-hexyl ethyl acrylate, or any combination thereof.

In some embodiments, the first membrane comprises at least one of at least one pigment, at least one flocculant, at least one desiccant, at least one film formation additive, at least one functional filler, at least one rheology modifier, at least one crosslinker, or any combination thereof. In some embodiments, the at least one pigment comprises an insoluble particle used to impart color. In some embodiments, the at least one pigment comprises at least one of finely ground natural particles, finely ground synthetic particles, or any combination thereof. In some embodiments, the at least one pigment comprises at least one of titanium oxide, zinc oxide, or any combination thereof. In some embodiments, the at least one desiccant comprises at least one of at least one calcium oxide, Portland cement, calcium silicate hydrate, or any combination thereof. In some embodiments, the at least one flocculant comprises at least one charged polymer, at least one multivalent metal salt (such as, but not limited to, aluminum sulfate), or any combination thereof. In some embodiments, the at least one film formation additive comprises at least one of a hydrophobic film formation additive, a hydrophilic film formation additive, a partially water-soluble film formation additive, or any combination thereof. Examples of the at least one film formation additive include at least one of at least one hydrophobic film formation additive, at least one hydrophilic film formation additive, at least one partially water soluble, at least one film formation additive, or any combination thereof. Specific examples of at least one film formation additive include, without limitation, at least one of volatile solvents such as, but not limited to, dipropylene glycol n-butyl ether (DPnB) or 2,2,4-trimethyl-1,3-pentanediol monoisobutyrate (Eastman Texanol™ Ester solvent, 2323NPR, hereinafter "Texanol"), Loxanol® CA 5310 and Efka® PL 5651 from BASF Corporation, Eastman Optifilm™ Enhancer 400 from Eastman Chemical Company, (hereinafter, Optifilm 400), or any combination thereof. In some embodiments, a film formation additive is a "coalescent agent." In some embodiments, the at least one functional filler comprises at least one of silicate mineral, wollastonite, talc, mica, kaolin, feldspar, and nepheline syenite, at least one surface treated filler, at least one sub-micron filler at least one hydrophobic filler, at least one nano-filler, or any combination thereof. Non-limiting examples of the at least one sub-micron filler include, without limitation, at least one of at least one nanoclay, at least one platy filler, at least one nano-oxide, or any combination thereof. Non-limiting examples of the at least one surface treated filler include, without limitation, at least one calcium carbonate (e.g., Imerys Camel-Wite ST) and aluminum trihydrate (such as but not limited to Huber Hymod®, Micral® grade, Hymod® M9400 SG-surface treated grade, or any combination thereof). Non-limiting examples of at the at least one hydrophobic filler include, without limitation, Novakup® platy silica. Non-limiting examples of the at least one nano-filler include, without limitation, at least one of treated fumed silicas, untreated fumed silicas (e.g., Evonik® Areosil hydrophilic and hydrophobic grades), Oxylink™ pre-dispersed nano ZnO2 micronizer, at least one nano-kaolin clay, at least one bentonite clay, at least one, monomonilorite clay, or any combination thereof. In some embodiments, the at least one functional filler enhances film properties such as, but not limited to, tensile and adhesion properties. Examples of the at least one crosslinker include carbodiimide (e.g., Carbodilite series from Nisshinbo Chemical/GSI Exim America), at least one water stable epoxy silane (e.g. Momentive Coatosil 2287), or any combination thereof. Non-limiting examples of the at least one rheology modifier include, but are not limited to, HUER (i.e., at least one nonionic polyurethane associative thickener), Acrysol™ Rm-12w, 8W, 2323, 995, Dow™ Rheolate series, RM-12w, RM-995, RM-8W, or any combination thereof.

In some embodiments, the method of installation 100 comprises obtaining 104 a second membrane.

In some embodiments, the second membrane comprises a membrane. In some embodiments, the second membrane comprises a single-ply membrane. In some embodiments, the second membrane comprises a double-ply or two-ply membrane. In some embodiments, the second membrane comprises a multi-ply membrane. In some embodiments, the second membrane comprises a reinforcement. For example, in some embodiments, the second membrane is a reinforced membrane. In some embodiments, the reinforcement comprises at least one of a scrim, a woven fabric, a non-woven fabric, a metal foil, a fiberglass mat, a polyester mat, a spunbond mat, or any combination thereof. In some embodiments, the second membrane comprises at least one sheet. In some embodiments, the second membrane comprises only one sheet. In some embodiments, the second membrane comprises a plurality of sheets. In some embodiments, the second membrane comprises at least one polymer. In some embodiments, the second membrane comprises at least one of a thermoplastic polyolefin (TPO), a polyvinylchloride (PVC), an ethylene-propylene diene monomer (EPDM), a silyl-terminated polymer, a polysiloxane, or any combination thereof. In some embodiments, the second membrane is a thermoplastic polyolefin (TPO) membrane. In some embodiments, the second membrane is a polyvinyl chloride (PVC) membrane. In some embodiments, the second membrane is an ethylene propylene diene monomer (EPDM) membrane. In some embodiments, the second membrane is a silyl-terminated polymer membrane. In some embodiments, the second membrane is a silicone membrane. In some embodiments, the second membrane comprises a thermoplastic polymer. In some embodiments, the second membrane comprises an adhesive layer on at least one surface of the membrane. In some embodiments, the adhesive layer is configured to adhere the second membrane to a surface, such as, for example and without limitation, a surface of a building structure.

In some embodiments, the second membrane has a thickness of 1 mil to 200 mils. In some embodiments, the second membrane has a thickness of 10 mils to 200 mils. In some embodiments, the second membrane has a thickness of 20 mils to 200 mils. In some embodiments, the second membrane has a thickness of 30 mils to 200 mils. In some embodiments, the second membrane has a thickness of 40 mils to 200 mils. In some embodiments, the second membrane has a thickness of 50 mils to 200 mils. In some embodiments, the second membrane has a thickness of 60 mils to 200 mils. In some embodiments, the second membrane has a thickness of 70 mils to 200 mils. In some embodiments, the second membrane has a thickness of 80 mils to 200 mils. In some embodiments, the second membrane has a thickness of 90 mils to 200 mils. In some embodiments, the second membrane has a thickness of 100 mils to 200 mils. In some embodiments, the second membrane has a thickness of 110 mils to 200 mils. In some embodiments, the second membrane has a thickness of 120 mils to 200 mils. In some embodiments, the second membrane has a thickness of 130 mils to 200 mils. In some embodiments, the second membrane has a thickness of 140 mils to 200 mils. In some embodiments, the second membrane has a thickness of 150 mils to 200 mils. In some embodiments, the second membrane has a thickness of 160 mils to 200 mils. In some embodiments, the second membrane has a thickness of 170 mils to 200 mils. In some embodiments, the second membrane has a thickness of 180 mils to 200 mils. In some embodiments, the second membrane has a thickness of 190 mils to 200 mils.

In some embodiments, the second membrane has a thickness of 1 mil to 190 mils. In some embodiments, the second membrane has a thickness of 1 mil to 180 mils. In some embodiments, the second membrane has a thickness of 1 mil to 170 mils. In some embodiments, the second membrane has a thickness of 1 mil to 160 mils. In some embodiments, the second membrane has a thickness of 1 mil to 150 mils. In some embodiments, the second membrane has a thickness of 1 mil to 140 mils. In some embodiments, the second membrane has a thickness of 1 mil to 130 mils. In some embodiments, the second membrane has a thickness of 1 mil to 120 mils. In some embodiments, the second membrane has a thickness of 1 mil to 110 mils. In some embodiments, the second membrane has a thickness of 1 mil to 100 mils. In some embodiments, the second membrane has a thickness of 1 mil to 90 mils. In some embodiments, the second membrane has a thickness of 1 mil to 80 mils. In some embodiments, the second membrane has a thickness of 1 mil to 70 mils. In some embodiments, the second membrane has a thickness of 1 mil to 60 mils. In some embodiments, the second membrane has a thickness of 1 mil to 50 mils. In some embodiments, the second membrane has a thickness of 1 mil to 40 mils. In some embodiments, the second membrane has a thickness of 1 mil to 30 mils. In some embodiments, the second membrane has a thickness of 1 mil to 20 mils. In some embodiments, the second membrane has a thickness of 1 mil to 10 mils.

In some embodiments, the method of installation 100 comprises obtaining 106 an aerosilizable composition.

As used herein, the term "aerosilizable composition" refers to a composition comprising at least one polymer and a propellant stored in an aerosol product container. In some embodiments, the aerosilizable composition is useful as an adhesive. In some embodiments, the aerosilizable composition is useful as a coating. In some embodiments, the aerosilizable composition comprises a sprayable moisture-curable composition. In some embodiments, the aerosilizable composition is useful as a membrane. In some embodiments, the aerosilizable composition is useful as a barrier membrane. In some embodiments, the aerosilizable composition is useful as an air and water barrier membrane. In some embodiments, the aerosilizable composition is useful as a water vapor permeable membrane. In some embodiments, the aerosilizable composition is useful as a water vapor impermeable membrane. In some embodiments, the aerosilizable composition is useful as a primer composition. In some embodiments, the aerosilizable composition is useful as a primer layer. In some embodiments, the aerosilizable composition is useful as a barrier membrane spray film.

In some embodiments, the aerosilizable composition comprises at least one polymer.

In some embodiments, the aerosilizable composition comprises 10% to 99% by weight of the at least one polymer based on a total weight of the aerosilizable composition. In some embodiments, the aerosilizable composition comprises 10% to 90% by weight of the at least one polymer based on a total weight of the aerosilizable composition. In some embodiments, the aerosilizable composition comprises 10% to 80% by weight of the at least one polymer based on a total weight of the aerosilizable composition. In some embodiments, the aerosilizable composition comprises 10% to 70% by weight of the at least one polymer based on a total weight of the aerosilizable composition. In some embodiments, the aerosilizable composition comprises 10% to 60% by weight of the at least one polymer based on the total weight of the aerosilizable composition. In some embodiments, the aerosilizable composition comprises 10% to 50% by weight of the at least one polymer based on the total weight of the aerosilizable composition. In some embodiments, the aerosilizable composition comprises 10% to 40% by weight of the at least one polymer based on the total weight of the aerosilizable composition. In some embodiments, the aerosilizable composition comprises 10% to 30% by weight of the at least one polymer based on the total weight of the aerosilizable composition. In some embodiments, the aerosilizable composition comprises 10% to 20% by weight of the at least one polymer based on the total weight of the aerosilizable composition.

In some embodiments, the aerosilizable composition comprises 20% to 99% by weight of the at least one polymer based on the total weight of the aerosilizable composition. In some embodiments, the aerosilizable composition comprises 30% to 99% by weight of the at least one polymer based on the total weight of the aerosilizable composition. In some embodiments, the aerosilizable composition comprises 40% to 99% by weight of the at least one polymer based on the total weight of the aerosilizable composition. In some embodiments, the aerosilizable composition comprises 50% to 99% by weight of the at least one polymer based on the total weight of the aerosilizable composition. In some embodiments, the aerosilizable composition comprises 60% to 99% by weight of the at least one polymer based on the total weight of the aerosilizable composition. In some embodiments, the aerosilizable composition comprises 70% to 99% by weight of the at least one polymer based on the total weight of the aerosilizable composition. In some embodiments, the aerosilizable composition comprises 80% to 99% by weight of the at least one polymer based on the total weight of the aerosilizable composition. In some embodiments, the aerosilizable composition comprises 90% to 99% by weight of the at least one polymer based on the total weight of the aerosilizable composition.

In some embodiments, the aerosilizable composition comprises 20% to 70% by weight of the at least one polymer based on the total weight of the aerosilizable composition. In some embodiments, the aerosilizable composition comprises 30% to 70% by weight of the at least one polymer based on the total weight of the aerosilizable composition. In some embodiments, the aerosilizable composition comprises 40% to 70% by weight of the at least one polymer based on the total weight of the aerosilizable composition. In some embodiments, the aerosilizable composition comprises 50% to 70% by weight of the at least one polymer based on the total weight of the aerosilizable composition. In some embodiments, the aerosilizable composition comprises 60% to 70% by weight of the at least one polymer based on the total weight of the aerosilizable composition.

In some embodiments, the aerosilizable composition comprises 60% to 99% by weight of the at least one polymer based on the total weight of the aerosilizable composition. In some embodiments, the aerosilizable composition comprises 60% to 95% by weight of the at least one polymer based on the total weight of the aerosilizable composition. In some embodiments, the aerosilizable composition comprises 60% to 90% by weight of the at least one polymer based on the total weight of the aerosilizable composition. In some embodiments, the aerosilizable composition comprises 60% to 85% by weight of the at least one polymer based on the total weight of the aerosilizable composition. In some embodiments, the aerosilizable composition comprises 60% to 80% by weight of the at least one polymer based on the total weight of the aerosilizable composition. In some embodiments, the aerosilizable composition comprises 60% to 75% by weight of the at least one polymer based on the total weight of the aerosilizable composition. In some embodiments, the aerosilizable composition comprises 60% to 70% by weight of the at least one polymer based on the total weight of the aerosilizable composition. In some embodiments, the aerosilizable composition comprises 60% to 65% by weight of the at least one polymer based on the total weight of the aerosilizable composition.

In some embodiments, when the aerosilizable composition comprises at least 60%, up to 99%, by weight of the at least one polymer, the at least one polymer comprises a solid silicon-containing polymer.

In some embodiments, the at least one polymer comprises a silicon-containing polymer. In some embodiments, the at least one polymer comprises at least one of a silyl-terminated polymer, a polysiloxane, any precursor thereof, any monomer thereof, any oligomer thereof, or any combination thereof. In some embodiments, the at least one polymer comprises at least one of a linear polysiloxane, a cyclic polysiloxane, a branched polysiloxane, any monomer thereof, any oligomer thereof, or any combination thereof. In some embodiments, the at least one polymer comprises at least one of a silyl-terminated polyurethane, a silyl-terminated polyether, a silyl-terminated acrylic, a silyl-terminated polyester, any monomer thereof, any oligomer thereof, or any combination thereof. In some embodiments, the at least one polymer comprises at least one of polyester, polyethylene, polypropylene, polyurethane, polyurea, any monomer thereof, any oligomer thereof, or any combination thereof. In some embodiments, the at least one polymer comprises at least one of a liquid silicone resin, a silicone gum, or any combination thereof. In some embodiments, the at least one polymer comprises at least one of a linear polysiloxane, a cyclic polysiloxane, a branched polysiloxane, polyester, polyethylene, polypropylene, polyurethane, polyurea, a liquid silicone resin, a silicone gum, a polyolefin, a polycarbonate, a polyether, a silylated polyurethane, a silyl-terminated polyurethane, a silyl-terminated polyether, a silyl-terminated acrylic, a silyl-terminated polyester, any monomer thereof, any oligomer thereof, or any combination thereof. In some embodiments, the at least one polymer is present in a solid phase. As used herein, the term "solid," when used to describe a polymer, refers to a polymer present in a solid phase in the aerosilizable composition. In some embodiments, the at least one polymer is present in a liquid phase. As used herein, the term "liquid," when used to describe a polymer, refers to a polymer present in a liquid phase in the aerosilizable composition. In some embodiments, the at least one polymer is present in a gas or vapor phase. As used herein, the term "gas" and/or "vapor," when used to describe a polymer, refers to a polymer present in a gas phase and/or vapor phase in the aerosilizable composition. In some embodiments, the at least one polymer is present in a mixture of at least two phases. Non-limiting examples of solid polymers, liquid polymers, and/or gas/vapor polymers, include for example and without limitation, any of the polymers disclosed herein. In some embodiments, for example, the at least one polymer comprises at least one of a solid silyl-terminated polymer, a solid polysiloxane, or any combination thereof.

In some embodiments, the at least one polymer comprises a polysiloxane. As used herein, a "polysiloxane" is a polymer that includes at least two of the following repeat units: —R$_2$Si—O—SiR$_2$—, where R is an organic group, or hydrogen. As used herein, an "organic group" may encompass any organosilicon group, such as but not limited to a silanol group or an alkyl silyl group. In some embodiments, each R is independently a hydrogen, an alkyl, an alkenyl, or an aryl. In some embodiments, each R is independently a hydrogen, a methyl, a phenyl, or a vinyl. In some embodiments, a terminal group of the polysiloxane is a terminal group of the formula: —OSiR$_3$, wherein each R is independently a hydrogen, an alkyl, an alkenyl, an aryl, or a hydroxyl. For example, in some embodiments, each R of the terminal group is independently a hydrogen, a methyl, a vinyl, or a hydroxyl. In some embodiments, a polysiloxane may include ten or more of the aforementioned repeat units. In some embodiments, a polysiloxane may include hundreds of the aforementioned repeat units. In some embodiments, a polysiloxane may include thousands of the aforementioned repeat units. In some embodiments, a polysiloxane may include tens-of-thousands of the aforementioned repeat units. In some embodiments, a polysiloxane may include hundreds-of-thousands of the aforementioned repeat units. In some embodiments, a polysiloxane may include millions of the aforementioned repeat units. As used herein, a "polysiloxane" may also include any version of the aforementioned formula where at least one of the R groups is substituted with an organic group. In some embodiments, the polysiloxane is unsubstituted, such that all of the R groups may be the same. In some embodiments, the polysiloxane is substituted such that some of the R groups may be the same while others may differ from each other. In some embodiments, the polysiloxane is substituted such that all of the R groups are different. In some embodiments, the polysiloxane is substituted or "terminated" with an organic group at the end of a polymer chain.

In some embodiments, the polysiloxane comprises or is selected from the group consisting of a hydroxy terminated polysiloxane, a di-hydroxy terminated polysiloxane, a vinyl terminated polysiloxane, a di-vinyl terminated polysiloxane, a tri-methyl-silyl terminated polysiloxane, a mono-trimethoxy terminated polysiloxane, a silanol terminated polysiloxane, or any combination thereof.

In some embodiments, the polysiloxane comprises or is selected from the group consisting of a hydroxy terminated polysiloxane, a di-hydroxy terminated polysiloxane, a vinyl terminated polysiloxane, a di-vinyl terminated polysiloxane, a tri-methyl-silyl terminated polysiloxane, or any combination thereof.

In some embodiments, the polysiloxane comprises or is selected from the group consisting of a mono-trimethoxy terminated polysiloxane, a silanol terminated polysiloxane, or any combination thereof.

In some embodiments, the polysiloxane comprises, consists, or consists essentially of a mono-trimethoxy terminated polysiloxane. In some embodiments, the polysiloxane comprises, consists, or consists essentially of a silanol terminated polysiloxane.

As used herein, a "silane" is any compound having the general formula Si$_n$R$_{2n+2}$, where R is hydrogen, an organic group, or any combination thereof. As used herein, a "silane" may also include any version of the aforementioned formula where at least one of the R groups is substituted with an organic group. In some embodiments, the silane is unsubstituted, such that all of the R groups may be the same. In some embodiments, the silane is substituted such that some of the R groups may be the same while others may differ from each other. In some embodiments, the silane is substituted such that all of the R groups are different. Examples of at least one substituent R group may include, but is not limited to at least one amino group (in the non-limiting case of an aminosilane) and at least one methoxy group (in the non-limiting case of a methoxysilane).

In some embodiments, a silane may also encompass a bipodal silane. As used herein, a "bipodal silane" is a silane having the general formula R$_3$Si—R—SiR$_3$.

In some embodiments, the at least one silane comprises or is selected from the group consisting of an associative silane, a non-associative silane, or any combination thereof. In some embodiments, the at least one silane comprises, consists, or consists essentially of an associative silane. In some embodiments, the at least one silane comprises, consists, or consists essentially of a non-associative silane.

As used herein, an "associative silane" is a silane having the general formula Si(R$^1$)$_n$(R$^2$)$_{n+2}$; where each R$^1$ group is a crosslinkable functional group, such as but not limited to, an alkoxy group, acetoxy group, or an oxime group; and where at least one of the R$^2$ groups is a functional group that interacts with another R$^2$ group, interacts with another component in the aerosilizable composition, or any combination thereof. In some embodiments, the interaction occurs by an interaction mechanism, such as but not limited to, hydrogen bonding, electrostatic attraction, TT-TT stacking, or any combination thereof.

As used herein a "non-associative silane" is any silane that is not an "associative silane."

In some embodiments, the associative silane comprises or is selected from the group consisting of an epoxysilane, an aminosilane, a diphenylsilane, or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, glycidoxypropyltrimethoxysilane, aminoethylaminopropyltrimethoxysilane, or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, or any combination thereof.

In some embodiments, the associative silane comprises or is selected from the group consisting of glycidoxypropyltrimethoxysilane, aminoethylaminopropyltrimethoxysilane, or any combination thereof.

In some embodiments, the associative silane comprises, consists, or consists essentially of glycidoxypropyltrimethoxysilane.

In some embodiments, the associative silane comprises, consists, or consists essentially of aminoethylaminopropyltrimethoxysilane.

In some embodiments, the non-associative silane is octylsilane.

In some embodiments, the non-associative silane comprises or is selected from the group consisting of octyltrimethoxysilane, vinyltrimethoxysilane, or any combination thereof.

In some embodiments, the non-associative silane is vinyltrimethoxysilane.

In some embodiments, the non-associative silane is octyltrimethoxysilane.

In some embodiments, the aerosilizable composition comprises at least one bipodal silane. Non-limiting examples of a bipodal silane include bis(trimethoxysilylpropyl) amine (commercially available as Andisil® 1170) and bis [3-(triethoxysilyl) propyl] tetrasulfide (commercially available as Andisil® 1289).

In some embodiments, the aerosilizable composition does not comprise a bipodal silane.

In some embodiments, the aerosilizable composition may exclude certain specific bipodal silanes. For instance, in some embodiments, the aerosilizable composition does not comprise bis-(triethoxysilyl) ethane, bis(trimethoxysilylpropyl) amine, bis [3-(triethoxysilyl) propyl] tetrasulfide, or any combination thereof.

In some embodiments, the polysiloxane comprises a silanol-terminated polysiloxane. In some embodiments, the polysiloxane comprises a silanol-terminated polydimethylsiloxane.

Examples of hydroxyl-terminated polysiloxanes include, without limitation, Andisil® OH Polymers, such as, for example and without limitation, at least one of Andisil® OH 750 Silanol terminated 750 cps; Andisil® OH 1,000 Silanol terminated 1,000 cps; Andisil® OH 2,000 Silanol terminated 2,000 cps; Andisil® OH 3,500 Silanol terminated 3,500 cps; Andisil® OH 4,000 Silanol terminated 4,000 cps; Andisil® OH 6,000 Silanol terminated 6,000 cps; Andisil® OH 14,000 Silanol terminated 14,000 cps; Andisil® OH 20,000 Silanol terminated 20,000 cps; Andisil® OH 50,000 Silanol terminated 50,000 cps; Andisil® OH 80,000 Silanol terminated 80,000 cps; Andisil® OH 300,000 Silanol terminated 300,000 cps; or any combination thereof.

In some embodiments, the at least one polymer comprises a one-part moisture curable polymer. In some embodiments, the at least one polymer comprises a two-part moisture curable polymer.

In some embodiments, the aerosilizable composition comprises at least one propellant.

In some embodiments, the aerosilizable composition comprises 10% to 90% by weight of the at least one propellant based on the total weight of the aerosilizable composition. In some embodiments, the aerosilizable composition comprises 10% to 80% by weight of the at least one propellant based on the total weight of the aerosilizable composition. In some embodiments, the aerosilizable composition comprises 10% to 70% by weight of the at least one propellant based on the total weight of the aerosilizable composition. In some embodiments, the aerosilizable composition comprises 10% to 60% by weight of the at least one propellant based on the total weight of the aerosilizable composition. In some embodiments, the aerosilizable composition comprises 10% to 50% by weight of the at least one propellant based on the total weight of the aerosilizable composition. In some embodiments, the aerosilizable composition comprises 10% to 40% by weight of the at least one propellant based on the total weight of the aerosilizable composition. In some embodiments, the aerosilizable composition comprises 10% to 30% by weight of the at least one propellant based on the total weight of the aerosilizable composition. In some embodiments, the aerosilizable composition comprises 10% to 20% by weight of the at least one propellant based on the total weight of the aerosilizable composition.

In some embodiments, the aerosilizable composition comprises 20% to 90% by weight of the at least one propellant based on the total weight of the aerosilizable composition. In some embodiments, the aerosilizable composition comprises 30% to 90% by weight of the at least one propellant based on the total weight of the aerosilizable composition. In some embodiments, the aerosilizable composition comprises 40% to 90% by weight of the at least one propellant based on the total weight of the aerosilizable composition. In some embodiments, the aerosilizable composition comprises 50% to 90% by weight of the at least one propellant based on the total weight of the aerosilizable composition. In some embodiments, the aerosilizable composition comprises 60% to 90% by weight of the at least one propellant based on the total weight of the aerosilizable composition. In some embodiments, the aerosilizable composition comprises 70% to 90% by weight of the at least one propellant based on the total weight of the aerosilizable composition. In some embodiments, the aerosilizable composition comprises 80% to 90% by weight of the at least one propellant based on the total weight of the aerosilizable composition.

In some embodiments, the at least one propellant comprises at least one of a propane, a butane, a trans-1,3,3,3-tetrafluoropropene, dimethyl ether, isobutane, n-butane, isopropane, n-propane, nitrogen, oxygen, helium, hydrogen, air, carbon dioxide, or any combination thereof.

In some embodiments, the aerosilizable composition comprises at least one catalyst.

In some embodiments, the aerosilizable composition comprises 0.1% to 15% by weight of the at least one catalyst based on the total weight of the aerosilizable composition. In some embodiments, the aerosilizable composition comprises 1% to 15% by weight of the at least one catalyst based on the total weight of the aerosilizable composition. In some embodiments, the aerosilizable composition comprises 5% to 15% by weight of the at least one catalyst based on the total weight of the aerosilizable composition. In some embodiments, the aerosilizable composition comprises 10% to 15% by weight of the at least one catalyst based on the total weight of the aerosilizable composition.

In some embodiments, the aerosilizable composition comprises 0.1% to 10% by weight of the at least one catalyst based on the total weight of the aerosilizable composition. In some embodiments, the aerosilizable composition comprises 0.1% to 5% by weight of the at least one catalyst based on the total weight of the aerosilizable composition. In some embodiments, the aerosilizable composition comprises 0.1% to 1% by weight of the at least one catalyst based on the total weight of the aerosilizable composition. In some embodiments, the aerosilizable composition comprises 0.1% to 0.5% by weight of the at least one catalyst based on the total weight of the aerosilizable composition. In some embodiments, the aerosilizable composition comprises 0.01% to 2% by weight of the at least one catalyst based on the total weight of the aerosilizable composition. In some embodiments, the aerosilizable composition comprises 0.01% to 1% by weight of the at least one catalyst based on the total weight of the aerosilizable composition. In some embodiments, the aerosilizable composition comprises 0.01% to 0.5% by weight of the at least one catalyst based on the total weight of the aerosilizable composition. In some embodiments, the aerosilizable composition comprises 0.01% to 0.1% by weight of the at least one catalyst based on the total weight of the aerosilizable composition.

In some embodiments, the at least one catalyst comprises at least one of an organic tin or organotin, an organic platinum, triethanolamine titanate, dimethyltin dioleate, dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laurate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, di-tertiary butoxy titanium bismethyl acetoacetate, or any combination thereof.

In some embodiments, the aerosilizable composition comprises a silicone fluid.

In some embodiments, the aerosilizable composition comprises 1% to 30% by weight of the silicone fluid based on the total weight of the aerosilizable composition. In some embodiments, the aerosilizable composition comprises 5% to 30% by weight of the silicone fluid based on the total weight of the aerosilizable composition. In some embodiments, the aerosilizable composition comprises 10% to 30% by weight of the silicone fluid based on the total weight of the aerosilizable composition. In some embodiments, the aerosilizable composition comprises 15% to 30% by weight of the silicone fluid based on the total weight of the aerosilizable composition. In some embodiments, the aerosilizable composition comprises 20% to 30% by weight of the silicone fluid based on the total weight of the aerosilizable composition. In some embodiments, the aerosilizable composition comprises 25% to 30% by weight of the silicone fluid based on the total weight of the aerosilizable composition.

In some embodiments, the aerosilizable composition comprises 1% to 25% by weight of the silicone fluid based on the total weight of the aerosilizable composition. In some embodiments, the aerosilizable composition comprises 1% to 20% by weight of the silicone fluid based on the total weight of the aerosilizable composition. In some embodiments, the aerosilizable composition comprises 1% to 15% by weight of the silicone fluid based on the total weight of the aerosilizable composition. In some embodiments, the aerosilizable composition comprises 1% to 10% by weight of the silicone fluid based on the total weight of the aerosilizable composition. In some embodiments, the aerosilizable composition comprises 1% to 5% by weight of the silicone fluid based on the total weight of the aerosilizable composition.

In some embodiments, the silicone fluid comprises an inert silicone fluid. In some embodiments, the silicone fluid comprises at least one of a linear silicone, a cyclic silicone, a branched silicone, or any combination thereof. In some embodiments, the silicone fluid comprises at least one of octamethylcyclotetrasiloxane, decamethylcyclopentasiloxane, trimethylsilyl terminated linear polydimethylsiloxane, or any combination thereof.

In some embodiments, the at least one polymer compound comprises at least one filler.

In some embodiments, the aerosilizable composition comprises 1% to 70% by weight of the at least one filler based on the total weight of the aerosilizable composition. In some embodiments, the aerosilizable composition comprises 10% to 70% by weight of the at least one filler based on the total weight of the aerosilizable composition. In some embodiments, the aerosilizable composition comprises 20% to 70% by weight of the at least one filler based on the total weight of the aerosilizable composition. In some embodiments, the aerosilizable composition comprises 30% to 70% by weight of the at least one filler based on the total weight of the aerosilizable composition. In some embodiments, the aerosilizable composition comprises 40% to 70% by weight of the at least one filler based on the total weight of the aerosilizable composition. In some embodiments, the aerosilizable composition comprises 50% to 70% by weight of the at least one filler based on the total weight of the aerosilizable composition. In some embodiments, the aerosilizable composition comprises 60% to 70% by weight of the at least one filler based on the total weight of the aerosilizable composition.

In some embodiments, the aerosilizable composition comprises 1% to 65% by weight of the at least one filler based on the total weight of the aerosilizable composition. In some embodiments, the aerosilizable composition comprises 1% to 60% by weight of the at least one filler based on the total weight of the aerosilizable composition. In some embodiments, the aerosilizable composition comprises 1% to 50% by weight of the at least one filler based on the total weight of the aerosilizable composition. In some embodiments, the aerosilizable composition comprises 1% to 40% by weight of the at least one filler based on the total weight of the aerosilizable composition. In some embodiments, the aerosilizable composition comprises 1% to 30% by weight of the at least one filler based on the total weight of the aerosilizable composition. In some embodiments, the aerosilizable composition comprises 1% to 20% by weight of the at least one filler based on the total weight of the aerosilizable composition. In some embodiments, the aerosilizable composition comprises 1% to 10% by weight of the at least one filler based on the total weight of the aerosilizable composition.

In some embodiments, the at least one filler comprises at least one of nepheline syenite, calcium carbonate, precipitated calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, or any combination thereof.

In some embodiments, the at least one polymer compound comprises a fumed silica.

In some embodiments, the aerosilizable composition comprises 0.1% to 20% by weight of the fumed silica based on the total weight of the aerosilizable composition. In some embodiments, the aerosilizable composition comprises 1% to 20% by weight of the fumed silica based on the total weight of the aerosilizable composition. In some embodiments, the aerosilizable composition comprises 5% to 20% by weight of the fumed silica based on the total weight of the aerosilizable composition. In some embodiments, the aerosilizable composition comprises 10% to 20% by weight of the fumed silica based on the total weight of the aerosilizable composition. In some embodiments, the aerosilizable composition comprises 15% to 20% by weight of the fumed silica based on the total weight of the aerosilizable composition.

In some embodiments, the aerosilizable composition comprises 0.1% to 15% by weight of the fumed silica based on the total weight of the aerosilizable composition. In some embodiments, the aerosilizable composition comprises 0.1% to 10% by weight of the fumed silica based on the total weight of the aerosilizable composition. In some embodiments, the aerosilizable composition comprises 0.1% to 5% by weight of the fumed silica based on the total weight of the aerosilizable composition. In some embodiments, the aerosilizable composition comprises 0.1% to 1% by weight of the fumed silica based on the total weight of the aerosilizable composition. In some embodiments, the aerosilizable composition comprises 0.1% to 0.8% by weight of the fumed silica based on the total weight of the aerosilizable composition. In some embodiments, the aerosilizable composition comprises 0.1% to 0.6% by weight of the fumed silica based on the total weight of the aerosilizable composition. In some embodiments, the aerosilizable composition comprises 0.1% to 0.5% by weight of the fumed silica based on the total weight of the aerosilizable composition. In some embodiments, the aerosilizable composition comprises 0.1% to 0.4% by weight of the fumed silica based on the total weight of the aerosilizable composition. In some embodiments, the aerosilizable composition comprises 0.1% to 0.2% by weight of the fumed silica based on the total weight of the aerosilizable composition.

In some embodiments, the fumed silica comprises at least one of a fumed silica powder, a modified fumed silica, a hydrophilic fumed silica, a hydrophobic fumed silica, or any combination thereof. In some embodiments, the fumed silica is after treated with dimethyldichlorosilane.

In some embodiments, the aerosilizable composition comprises at least one pigment.

In some embodiments, the aerosilizable composition comprises 1% to 20% by weight of the at least one pigment based on the total weight of the aerosilizable composition. In some embodiments, the aerosilizable composition comprises 5% to 20% by weight of the at least one pigment based on the total weight of the aerosilizable composition. In some embodiments, the aerosilizable composition comprises 10% to 20% by weight of the at least one pigment based on the total weight of the aerosilizable composition. In some embodiments, the aerosilizable composition comprises 15% to 20% by weight of the at least one pigment based on the total weight of the aerosilizable composition.

In some embodiments, the aerosilizable composition comprises 1% to 15% by weight of the at least one pigment based on the total weight of the aerosilizable composition. In some embodiments, the aerosilizable composition comprises 1% to 10% by weight of the at least one pigment based on the total weight of the aerosilizable composition. In some embodiments, the aerosilizable composition comprises 1% to 5% by weight of the at least one pigment based on the total weight of the aerosilizable composition.

In some embodiments, the at least one pigment comprises at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

In some embodiments, the aerosilizable composition comprises at least one crosslinker.

In some embodiments, the aerosilizable composition comprises 1% to 25% by weight of the at least one crosslinker based on the total weight of the aerosilizable composition. In some embodiments, the aerosilizable composition comprises 5% to 25% by weight of the at least one crosslinker based on the total weight of the aerosilizable composition. In some embodiments, the aerosilizable composition comprises 10% to 25% by weight of the at least one crosslinker based on the total weight of the aerosilizable composition. In some embodiments, the aerosilizable composition comprises 15% to 25% by weight of the at least one crosslinker based on the total weight of the aerosilizable composition. In some embodiments, the aerosilizable composition comprises 20% to 25% by weight of the at least one crosslinker based on the total weight of the aerosilizable composition.

In some embodiments, the aerosilizable composition comprises 1% to 20% by weight of the at least one crosslinker based on the total weight of the aerosilizable composition. In some embodiments, the aerosilizable composition comprises 1% to 15% by weight of the at least one crosslinker based on the total weight of the aerosilizable composition. In some embodiments, the aerosilizable composition comprises 1% to 10% by weight of the at least one crosslinker based on the total weight of the aerosilizable composition. In some embodiments, the aerosilizable composition comprises 1% to 5% by weight of the at least one crosslinker based on the total weight of the aerosilizable composition. In some embodiments, the aerosilizable composition comprises 0.1% to 2% by weight of the at least one crosslinker based on the total weight of the aerosilizable composition. In some embodiments, the aerosilizable composition comprises 0.1% to 1% by weight of the at least one crosslinker based on the total weight of the aerosilizable composition. In some embodiments, the aerosilizable composition comprises 0.01% to 2% by weight of the at least one crosslinker based on the total weight of the aerosilizable composition. In some embodiments, the aerosilizable composition comprises 0.01% to 1% by weight of the at least one crosslinker based on the total weight of the aerosilizable composition.

In some embodiments, the at least one crosslinker comprises a neutral curing agent. In some embodiments, the at least one crosslinker comprises at least one of ketoxime silanes, alkoxysilanes, acetoxysilanes, isopropenoxy silanes, a partial hydrolysate/condensate of said silanes, or any combination thereof. In some embodiments, the at least one crosslinker comprises an organosilane, which may contain at least 2 or at least 3 hydrolyzable groups in one molecule and/or its partial hydrolysate. In some embodiments, a hydrolyzable group in such an organosilane or its partial hydrolysate includes at least one of a ketoxime group, an alkoxy group, an acetoxy group, an isopropenoxy group, or any combination thereof. In some embodiments, the at least one crosslinker comprises an organic titanate, a thermal radical initiator, a UV radical initiator, or any combination thereof. In some embodiments, the at least one crosslinker comprises ketoxime silanes. In some embodiments, a ketoxime silane comprises at least one of tetrakis(methylethylketoxime) silane, methyltris(dimethylketoxime) silane, methyltris(methylethylketoxime) silane, ethyltris (methylethylketoxime) silane, methyltris(methyl isobutyl ketoxime) silane, vinyl tris(methylethylketoxime) silane or any combination thereof. In some embodiments, the at least one crosslinker comprises an alkoxysilane. In some embodiments, the alkoxysilane comprises at least one of methyltrimethoxysilane, vinyltrimethoxysilane, phenyltrimethoxysilane, vinyltriethoxy silane, or any combination thereof. In some embodiments, the at least one crosslinker comprises an acetoxysilane. In some embodiments, the acetoxysilane comprises at least one of methyltriacetoxysilane, vinyltriacetoxysilane, or any combination thereof. In some embodiments, the at least one crosslinker comprises an isopropenoxy silane. In some embodiments, the isopropenoxy silane at comprises least one of methyltriisopropenoxysilane, vinyltriisopropenoxysilane, phenyltriisopropenoxysilane, or any combination thereof. In some embodiments, the at least one crosslinker comprises a partial hydrolysate/condensate of any one of the silanes disclosed herein. In some embodiments, the at least one crosslinker comprises at least one of methyltris(methylethylketoxime) silane, vinyltris(methylethylketoxime) silane, or any combination thereof.

In some embodiments, the aerosilizable composition comprises at least one adhesion promoter.

In some embodiments, the aerosilizable composition comprises 0.1% to 20% by weight of the at least one adhesion promoter based on the total weight of the aerosilizable composition. In some embodiments, the aerosilizable composition comprises 1% to 20% by weight of the at least one adhesion promoter based on the total weight of the aerosilizable composition. In some embodiments, the aerosilizable composition comprises 5% to 20% by weight of the at least one adhesion promoter based on the total weight of the aerosilizable composition. In some embodiments, the aerosilizable composition comprises 10% to 20% by weight of the at least one adhesion promoter based on the total weight of the aerosilizable composition. In some embodiments, the aerosilizable composition comprises 15% to 20% by weight of the at least one adhesion promoter based on the total weight of the aerosilizable composition.

In some embodiments, the aerosilizable composition comprises 0.1% to 15% by weight of the at least one adhesion promoter based on the total weight of the aerosilizable composition. In some embodiments, the aerosilizable composition comprises 0.1% to 10% by weight of the at least one adhesion promoter based on the total weight of the aerosilizable composition. In some embodiments, the aerosilizable composition comprises 0.1% to 5% by weight of the at least one adhesion promoter based on the total weight of the aerosilizable composition. In some embodiments, the aerosilizable composition comprises 0.1% to 2% by weight of the at least one adhesion promoter based on the total weight of the aerosilizable composition. In some embodiments, the aerosilizable composition comprises 0.1% to 1% by weight of the at least one adhesion promoter based on the total weight of the aerosilizable composition. In some embodiments, the aerosilizable composition comprises 0.1% to 0.8% by weight of the at least one adhesion promoter based on the total weight of the aerosilizable composition. In some embodiments, the aerosilizable composition comprises 0.1% to 0.6% by weight of the at least one adhesion promoter based on the total weight of the aerosilizable composition. In some embodiments, the aerosilizable composition comprises 0.1% to 0.5% by weight of the at least one adhesion promoter based on the total weight of the aerosilizable composition. In some embodiments, the aerosilizable composition comprises 0.1% to 0.4% by weight of the at least one adhesion promoter based on the total weight of the aerosilizable composition. In some embodiments, the aerosilizable composition comprises 0.1% to 0.2% by weight of the at least one adhesion promoter based on the total weight of the aerosilizable composition.

In some embodiments, the at least one adhesion promoter comprises at least one of dichlorodimethyl silane, a chlorinated polyolefin, an organosilane, an organotitanate, a zircoaluminate, a zirconate, an acrylate, an aryl phosphate ester, an alkyl phosphate ester, an aryl alkyl phosphate ester, a metal organic, a silica, a fumed silica, N-(2-aminoethyl)-3-aminopropyltrimethoxysilane, vinyl tris(2-methoxyethoxy) silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl) 3-aminopropyltrimethoxysilane, 3-aminopropyltriethoxysilane, 3-(N-aminomethylbenzylamino) propyltrimethoxysilane, 3-mercaptopropyltrimethoxysilane, 3-aminopropyltris (methylethylketoxime) silane, 3-glycidoxy propyltriisopropenoxysilane, 3-glycidoxypropylmethyldiisopropenoxysilane, any reaction product thereof, or any combination thereof. In some embodiments, the adhesion promoter is a reaction product of dichlorodimethylsilane and a silica agent. In some embodiments, the silica agent comprises a fumed silica. In some embodiments, the at least one adhesion promoter comprises at least one of tetraethyl orthosilicate, aminopropyltrimethoxysilane, or any combination thereof.

In some embodiments, the aerosilizable composition comprises at least one plasticizer.

In some embodiments, the aerosilizable composition comprises 1% to 65% by weight of the at least one plasticizer based on the total weight of the aerosilizable composition. In some embodiments, the aerosilizable composition comprises 1% to 60% by weight of the at least one plasticizer based on the total weight of the aerosilizable composition. In some embodiments, the aerosilizable composition comprises 1% to 50% by weight of the at least one plasticizer based on the total weight of the aerosilizable composition. In some embodiments, the aerosilizable composition comprises 1% to 40% by weight of the at least one plasticizer based on the total weight of the aerosilizable composition. In some embodiments, the aerosilizable composition comprises 1% to 30% by weight of the at least one plasticizer based on the total weight of the aerosilizable composition. In some embodiments, the aerosilizable composition comprises 1% to 20% by weight of the at least one plasticizer based on the total weight of the aerosilizable composition. In some embodiments, the aerosilizable composition comprises 1% to 10% by weight of the at least one plasticizer based on the total weight of the aerosilizable composition.

In some embodiments, the aerosilizable composition comprises 5% to 65% by weight of the at least one plasticizer based on the total weight of the aerosilizable composition. In some embodiments, the aerosilizable composition comprises 10% to 65% by weight of the at least one plasticizer based on the total weight of the aerosilizable composition. In some embodiments, the aerosilizable composition comprises 20% to 65% by weight of the at least one plasticizer based on the total weight of the aerosilizable composition. In some embodiments, the aerosilizable composition comprises 30% to 65% by weight of the at least one plasticizer based on the total weight of the aerosilizable composition. In some embodiments, the aerosilizable composition comprises 40% to 65% by weight of the at least one plasticizer based on the total weight of the aerosilizable composition. In some embodiments, the aerosilizable composition comprises 50% to 65% by weight of the at least one plasticizer based on the total weight of the aerosilizable composition. In some embodiments, the aerosilizable composition comprises 60% to 65% by weight of the at least one plasticizer based on the total weight of the aerosilizable composition. In some embodiments, the aerosilizable composition comprises 10% to 25% by weight of the at least one plasticizer based on the total weight of the aerosilizable composition.

In some embodiments, the at least one plasticizer comprises at least one of a polyether diol, iso decyl benzoate, triethylene glycol bis(2-ethylhexanoate), adipic acid esters, azelaic acid esters, benzoic acid esters, butyric acid esters, acetic acid esters; esters of fatty acids having 8 to 44 carbon atoms, esters of OH— or epoxidized fatty acids, fatty acid esters and fats, glycolic acid esters, phosphoric acid esters, phthalic acid esters of linear or branched alcohols containing 1 to 12 carbon atoms, propionic acid esters, sebacic acid esters, sulfonic acid esters, thiobutyric acid esters, trimellitic acid esters, citric acid esters, esters based on nitrocellulose and polyvinyl acetate, chlorinated paraffin, diphenyl chloride, dioctyl phthalate or tricresyl phosphate, diisodecyl phthalate (DIDP), dissiononyl phthalate (DINP), butyl benzyl phthalate (BBzP), or any combination thereof.

In some embodiments, the aerosilizable composition comprises at least one solvent. In some embodiments, the at least one solvent comprises at least one extender.

In some embodiments, the aerosilizable composition comprises 0.1% to 20% by weight of the at least one solvent based on the total weight of the aerosilizable composition. In some embodiments, the aerosilizable composition comprises 0.1% to 15% by weight of the at least one solvent based on the total weight of the aerosilizable composition. In some embodiments, the aerosilizable composition comprises 0.1% to 10% by weight of the at least one solvent based on the total weight of the aerosilizable composition. In some embodiments, the aerosilizable composition comprises 0.1% to 5% by weight of the at least one solvent based on the total weight of the aerosilizable composition. In some embodiments, the aerosilizable composition comprises 0.1% to 2% by weight of the at least one solvent based on the total weight of the aerosilizable composition. In some embodiments, the aerosilizable composition comprises 0.1% to 1% by weight of the at least one solvent based on the total weight of the aerosilizable composition. In some embodiments, the aerosilizable composition comprises 0.1% to 0.5% by weight of the at least one solvent based on the total weight of the aerosilizable composition.

In some embodiments, the aerosilizable composition comprises 1% to 20% by weight of the at least one solvent based on the total weight of the aerosilizable composition. In some embodiments, the aerosilizable composition comprises 5% to 20% by weight of the at least one solvent based on the total weight of the aerosilizable composition. In some embodiments, the aerosilizable composition comprises 10% to 20% by weight of the at least one solvent based on the total weight of the aerosilizable composition. In some embodiments, the aerosilizable composition comprises 15% to 20% by weight of the at least one solvent based on the total weight of the aerosilizable composition.

In some embodiments, the at least one solvent comprises at least one of methyl esters, fatty acids, salts of fatty acids, polysiloxanes, alkane diols, isoparaffinic solvents, aliphatic solvents, ester alcohols, glycol ethers and their derivatives, dibasic esters, or any combination thereof. In some embodiments, the at least one solvent comprises at least one of isoparaffinic hydrocarbon solvents, aromatic hydrocarbon solvents, glycol ethers, 1,3-butanediol, 1,4-butanediol, 1,5-pentanediol, 1-tetradecene, 2-pryrrolidone, 2-butoxy-1-propanol, 2-methyl-2,4-pentanediol, soy methyl esters, benzyl alcohol, dibasic esters, dialkyl phthalates, diethanolamine, glycol ether acetates, heavy hydrocarbon solvents, N,N'-diethyl-m-toluamide, triethylene glycol, triisopropanolamine, tripropylene glycol, parachlorobenzotrifluoride (PCBTF), perchloroethylene (PERC), d-limonene, methyl siloxanes, ethyl lactate, glycol ethers, polyglycolethers, triethylene glycol, tripropylene glycol, triisopropanolamine, benzyl alcohol, acetone, t-butyl acetate, fluorinated alkanes, methylene chloride, tetrachloroethylene, methylated siloxanes, ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monobutyl ether (2-butoxyethanol), ethylene glycol monophenyl ether (2-phenoxyethanol), ethylene glycol monobenzyl ether (2-benzyloxyethanol), diethylene glycol monomethyl ether (2-(2-methoxyethoxy) ethanol, methyl carbitol), diethylene glycol monoethyl ether (2-(2-ethoxyethoxy) ethanol, carbitol cellosolve), diethylene glycol mono-n-butyl ether (2-(2-butoxyethoxy) ethanol), ethylene glycol dimethyl ether (dimethoxyethane), ethylene glycol diethyl ether (diethoxyethane), ethylene glycol dibutyl ether (dibutoxyethane), ethylene glycol methyl ether acetate (2-methoxyethyl acetate), ethylene glycol monethyl ether acetate (2-ethoxyethyl acetate), ethylene glycol monobutyl ether acetate (2-butoxyethyl acetate), polyglycolethers, triethylene glycol, tripropylene glycol, triisopropanolamine, benzyl alcohol, or any combination thereof. In some embodiments, the at least one solvent comprises at least one of $C_{13}$-$C_{20}$ cycloparaffin, a $C_{13}$-$C_{20}$ isoparaffin hydrocarbon, or any combination thereof.

As used herein, the term “volatile organic compound(s)” or “VOC” refers to a compound comprising carbon. In some embodiments, a VOC comprises an organic compound comprising carbon. In some embodiments, a VOC is present in a liquid, for example, as a solvent or solution. In some embodiments, the VOC is present in other phases from which the VOC is volatile.

As used herein, the term “substantially free of a volatile organic compound (VOC)” refers to a composition comprising 5% by weight or less of at least one VOC. In some embodiments, the weight percentage is based on a total weight of the composition. The term includes compositions comprising no VOC. In some embodiments in which a composition is substantially free of a VOC, the composition comprises 0.1% to 5% by weight of the VOC based on a total weight of the composition.

In some embodiments, the aerosilizable composition is substantially free of the VOC. In some embodiments, the aerosilizable composition comprises 0.1% to 5% by weight of the VOC based on the total weight of the composition. In some embodiments, the aerosilizable composition comprises 0.1% to 4% by weight of the VOC based on the total weight of the composition. In some embodiments, the aerosilizable composition comprises 0.1% to 3% by weight of the VOC based on the total weight of the composition. In some embodiments, the aerosilizable composition comprises 0.1% to 2% by weight of the VOC based on the total weight of the composition. In some embodiments, the aerosilizable composition comprises 0.1% to 1% by weight of the VOC based on the total weight of the composition.

In some embodiments, the aerosilizable composition comprises 0.5% to 5% by weight of the VOC based on the total weight of the composition. In some embodiments, the aerosilizable composition comprises 1% to 5% by weight of the VOC based on the total weight of the composition. In some embodiments, the aerosilizable composition comprises 2% to 5% by weight of the VOC based on the total weight of the composition. In some embodiments, the aerosilizable composition comprises 3% to 5% by weight of the VOC based on the total weight of the composition. In some embodiments, the aerosilizable composition comprises 4% to 5% by weight of the VOC based on the total weight of the composition.

As used herein, the term "free of a volatile organic compound (VOC)" refers to a composition comprising 1% by weight or less of the VOC. In some embodiments, the weight percentage is based on a total weight of the composition. The term includes compositions comprising no VOC. In some embodiments, the aerosilizable composition is free of the VOC. In some embodiments in which a composition is substantially free of a VOC, the composition comprises 0.1% to 1% by weight of the VOC based on a total weight of the composition.

In some embodiments, the aerosilizable composition comprises 0.1% to 1% by weight of the VOC based on the total weight of the composition. In some embodiments, the aerosilizable composition comprises 0.1% to 0.9% by weight of the VOC based on the total weight of the composition. In some embodiments, the aerosilizable composition comprises 0.1% to 0.8% by weight of the VOC based on the total weight of the composition. In some embodiments, the aerosilizable composition comprises 0.1% to 0.7% by weight of the VOC based on the total weight of the composition. In some embodiments, the aerosilizable composition comprises 0.1% to 0.6% by weight of the VOC based on the total weight of the composition. In some embodiments, the aerosilizable composition comprises 0.1% to 0.5% by weight of the VOC based on the total weight of the composition. In some embodiments, the aerosilizable composition comprises 0.1% to 0.4% by weight of the VOC based on the total weight of the composition. In some embodiments, the aerosilizable composition comprises 0.1% to 0.3% by weight of the VOC based on the total weight of the composition. In some embodiments, the aerosilizable composition comprises 0.1% to 0.2% by weight of the VOC based on the total weight of the composition.

In some embodiments, the aerosilizable composition comprises 0.2% to 1% by weight of the VOC based on the total weight of the composition. In some embodiments, the aerosilizable composition comprises 0.3% to 1% by weight of the VOC based on the total weight of the composition. In some embodiments, the aerosilizable composition comprises 0.4% to 1% by weight of the VOC based on the total weight of the composition. In some embodiments, the aerosilizable composition comprises 0.5% to 1% by weight of the VOC based on the total weight of the composition. In some embodiments, the aerosilizable composition comprises 0.6% to 1% by weight of the VOC based on the total weight of the composition. In some embodiments, the aerosilizable composition comprises 0.7% to 1% by weight of the VOC based on the total weight of the composition. In some embodiments, the aerosilizable composition comprises 0.8% to 1% by weight of the VOC based on the total weight of the composition. In some embodiments, the aerosilizable composition comprises 0.9% to 1% by weight of the VOC based on the total weight of the composition. In some embodiments, the aerosilizable composition does not comprise the VOC.

In some embodiments, the aerosilizable composition has a viscosity of 5,000 cP to 15,000 cP as measured according to ASTM D2196 using a Brookfield viscometer at 20 rpm and 23° C. In some embodiments, the aerosilizable composition has a viscosity of 5,000 cP to 14,000 cP as measured according to ASTM D2196 using a Brookfield viscometer at 20 rpm and 23° C. In some embodiments, the aerosilizable composition has a viscosity of 5,000 cP to 13,000 cP as measured according to ASTM D2196 using a Brookfield viscometer at 20 rpm and 23° C. In some embodiments, the aerosilizable composition has a viscosity of 5,000 cP to 12,000 cP as measured according to ASTM D2196 using a Brookfield viscometer at 20 rpm and 23° C. In some embodiments, the aerosilizable composition has a viscosity of 5,000 cP to 11,000 cP as measured according to ASTM D2196 using a Brookfield viscometer at 20 rpm and 23° C. In some embodiments, the aerosilizable composition has a viscosity of 5,000 cP to 10,000 cP as measured according to ASTM D2196 using a Brookfield viscometer at 20 rpm and 23° C. In some embodiments, the aerosilizable composition has a viscosity of 5,000 cP to 9,000 cP as measured according to ASTM D2196 using a Brookfield viscometer at 20 rpm and 23° C. In some embodiments, the aerosilizable composition has a viscosity of 5,000 cP to 8,000 cP as measured according to ASTM D2196 using a Brookfield viscometer at 20 rpm and 23° C. In some embodiments, the aerosilizable composition has a viscosity of 5,000 cP to 7,000 cP as measured according to ASTM D2196 using a Brookfield viscometer at 20 rpm and 23° C. In some embodiments, the aerosilizable composition has a viscosity of 5,000 cP to 6,000 cP as measured according to ASTM D2196 using a Brookfield viscometer at 20 rpm and 23° C.

In some embodiments, the aerosilizable composition has a viscosity of 6,000 cP to 15,000 cP as measured according to ASTM D2196 using a Brookfield viscometer at 20 rpm and 23° C. In some embodiments, the aerosilizable composition has a viscosity of 7,000 cP to 15,000 cP as measured according to ASTM D2196 using a Brookfield viscometer at 20 rpm and 23° C. In some embodiments, the aerosilizable composition has a viscosity of 8,000 cP to 15,000 cP as measured according to ASTM D2196 using a Brookfield viscometer at 20 rpm and 23° C. In some embodiments, the aerosilizable composition has a viscosity of 9,000 cP to 15,000 cP as measured according to ASTM D2196 using a Brookfield viscometer at 20 rpm and 23° C. In some embodiments, the aerosilizable composition has a viscosity of 10,000 cP to 15,000 cP as measured according to ASTM D2196 using a Brookfield viscometer at 20 rpm and 23° C. In some embodiments, the aerosilizable composition has a viscosity of 11,000 cP to 15,000 cP as measured according to ASTM D2196 using a Brookfield viscometer at 20 rpm and 23° C. In some embodiments, the aerosilizable composition has a viscosity of 12,000 cP to 15,000 cP as measured according to ASTM D2196 using a Brookfield viscometer at 20 rpm and 23° C. In some embodiments, the aerosilizable composition has a viscosity of 13,000 cP to 15,000 cP as measured according to ASTM D2196 using a Brookfield viscometer at 20 rpm and 23° C. In some embodiments, the aerosilizable composition has a viscosity of 14,000 cP to 15,000 cP as measured according to ASTM D2196 using a Brookfield viscometer at 20 rpm and 23° C. In some embodiments, the aerosilizable composition has a viscosity of 8,000 cP to 13,000 cP as measured according to ASTM D2196 using a Brookfield viscometer at 20 rpm and 23° C.

In some embodiments, the aerosilizable composition has a viscosity of 8,000 cP to 12,000 cP as measured according to ASTM D2196 using a Brookfield viscometer at 20 rpm and 23° C. In some embodiments, the aerosilizable composition has a viscosity of 9,000 cP to 11,000 cP as measured according to ASTM D2196 using a Brookfield viscometer at 20 rpm and 23° C.

In some embodiments, the aerosilizable composition comprises 60% to 99% by weight of solids based on the total weight of the aerosilizable composition. In some embodiments, the aerosilizable composition comprises 60% to 95% by weight of solids based on the total weight of the aerosilizable composition. In some embodiments, the aerosilizable composition comprises 60% to 90% by weight of solids based on the total weight of the aerosilizable composition. In some embodiments, the aerosilizable composition comprises 60% to 85% by weight of solids based on the total weight of the aerosilizable composition. In some embodiments, the aerosilizable composition comprises 60% to 80% by weight of solids based on the total weight of the aerosilizable composition. In some embodiments, the aerosilizable composition comprises 60% to 75% by weight of solids based on the total weight of the aerosilizable composition. In some embodiments, the aerosilizable composition comprises 60% to 70% by weight of solids based on the total weight of the aerosilizable composition. In some embodiments, the aerosilizable composition comprises 60% to 65% by weight of solids based on the total weight of the aerosilizable composition.

In some embodiments, the aerosilizable composition comprises 65% to 99% by weight of solids based on the total weight of the aerosilizable composition. In some embodiments, the aerosilizable composition comprises 70% to 99% by weight of solids based on the total weight of the aerosilizable composition. In some embodiments, the aerosilizable composition comprises 75% to 99% by weight of solids based on the total weight of the aerosilizable composition. In some embodiments, the aerosilizable composition comprises 80% to 99% by weight of solids based on the total weight of the aerosilizable composition. In some embodiments, the aerosilizable composition comprises 85% to 99% by weight of solids based on the total weight of the aerosilizable composition. In some embodiments, the aerosilizable composition comprises 90% to 99% by weight of solids based on the total weight of the aerosilizable composition. In some embodiments, the aerosilizable composition comprises 95% to 99% by weight of solids based on the total weight of the aerosilizable composition.

In some embodiments, the method of installation comprises installing 108 the first membrane on a building structure.

As used herein, the term "building structure" refers to any structure of a building. For example, in some embodiments, a building structure comprises at least one of a wall, a wall assembly, a board, a siding, a sheet good, a panel, or any combination thereof. In some embodiments, the building structure comprises at least one of a roofing substrate. In some embodiments, the roofing substrate comprises at least one of at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the building structure comprises a contact surface, wherein the contact surface is formed of wood, metal, plastic, concrete, a polymer (e.g., polypropylene, polyethylene, thermoplastic polyolefin (TPO), polyvinyl chloride (PVC), poly(styrene-butadiene-styrene), or any combination thereof.

In some embodiments, installing 108 the first membrane on the building structure comprises applying the liquid applied membrane composition to the building structure. In some embodiments, installing 108 the first membrane comprises applying the liquid applied membrane composition to at least a portion of a first surface portion of a building structure. In some embodiments, installing 108 the first membrane comprises rolling the liquid applied membrane composition onto at least a portion of the first surface portion of the building structure. In some embodiments, installing 108 the first membrane comprises brushing the liquid applied membrane composition onto at least a portion of the first surface portion of the building structure. In some embodiments, installing 108 the first membrane comprises spraying the liquid applied membrane composition onto at least a portion of the first surface portion of the building structure. In some embodiments, installing 108 the first membrane comprises troweling the liquid applied membrane composition onto at least a portion of the first surface portion of the building structure. In some embodiments, installing 108 the first membrane comprises pouring the liquid applied membrane composition onto at least a portion of the first surface portion of the building structure. In some embodiments, installing 108 the first membrane comprises spreading the liquid applied membrane composition onto the building structure. In some embodiments, installing 108 the first membrane comprises spreading the liquid applied membrane composition on at least a portion of the first surface portion of the building structure. In some embodiments, installing 108 the first membrane comprises coating at least a portion of the first surface portion of the building structure with the liquid applied membrane composition. In some embodiments, the installing 108 is performed using at least one of a roller, a brush, a sprayer, a trowel, a coater, a similar tool, or any combination thereof.

In some embodiments, installing 108 comprises curing the liquid applied membrane composition, so as to form a liquid applied membrane. In some embodiments, installing 108 comprises curing the liquid applied membrane composition, so as to form a liquid applied membrane on at least a portion of the first surface portion of the building structure. In some embodiments, installing 108 comprises exposing the liquid applied membrane composition to ambient conditions for a duration sufficient to at least partially cure the liquid applied membrane composition. In some embodiments, installing 108 comprises heating the liquid applied membrane composition to a temperature sufficient to at least partially cure the liquid applied membrane composition. In some embodiments, installing 108 comprises exposing the liquid applied membrane composition to water moisture sufficient to at least partially cure the liquid applied membrane composition. In some embodiments, installing 108 comprises exposing the liquid applied membrane composition to light (e.g., ultraviolet light, visible light, infrared light, etc.) sufficient to at least partially cure the liquid applied membrane composition.

In some embodiments, installing 108 comprises curing the liquid applied membrane composition, so as to form an at least partially cured liquid applied membrane. In some embodiments, installing 108 comprises curing the liquid applied membrane composition, so as to form an at least substantially cured liquid applied membrane. In some embodiments, installing 108 comprises curing the liquid applied membrane composition, so as to form a fully cured liquid applied membrane. In some embodiments, installing 108 proceeds under conditions sufficient to at least partially cure the liquid applied membrane composition. In some embodiments, installing 108 proceeds under conditions sufficient to substantially cure the liquid applied membrane composition. In some embodiments, installing 108 proceeds under conditions sufficient to completely cure the liquid applied membrane composition.

In some embodiments, the liquid applied membrane is installed on at least a portion of the first surface portion of the building structure. In some embodiments, the liquid applied membrane is secured to at least a portion of the first surface portion of the building structure. In some embodiments, the liquid applied membrane is bonded to at least a portion of the first surface portion of the building structure. In some embodiments, the liquid applied membrane is adhered to at least a portion of the first surface portion of the building structure. In some embodiments, the liquid applied membrane covers at least a portion of the first surface portion of the building structure. In some embodiments, the liquid applied membrane directly contacts at least a portion of the first surface portion of the building structure. In some embodiments, an intervening layer is located between the liquid applied membrane and at least a portion of the first surface portion of the building structure.

In some embodiments, a thickness of the liquid applied membrane is 1 mil to 200 mils. In some embodiments, a thickness of the liquid applied membrane is 1 mil to 190 mils. In some embodiments, a thickness of the liquid applied membrane is 1 mil to 180 mils. In some embodiments, a thickness of the liquid applied membrane is 1 mil to 170 mils. In some embodiments, a thickness of the liquid applied membrane is 1 mil to 160 mils. In some embodiments, a thickness of the liquid applied membrane is 1 mil to 150 mils. In some embodiments, a thickness of the liquid applied membrane is 1 mil to 140 mils. In some embodiments, a thickness of the liquid applied membrane is 1 mil to 130 mils. In some embodiments, a thickness of the liquid applied membrane is 1 mil to 120 mils. In some embodiments, a thickness of the liquid applied membrane is 1 mil to 110 mils. In some embodiments, a thickness of the liquid applied membrane is 1 mil to 100 mils. In some embodiments, a thickness of the liquid applied membrane is 1 mil to 90 mils. In some embodiments, a thickness of the liquid applied membrane is 1 mil to 80 mils. In some embodiments, a thickness of the liquid applied membrane is 1 mil to 70 mils. In some embodiments, a thickness of the liquid applied membrane is 1 mil to 60 mils. In some embodiments, a thickness of the liquid applied membrane is 1 mil to 50 mils. In some embodiments, a thickness of the liquid applied membrane is 1 mil to 40 mils. In some embodiments, a thickness of the liquid applied membrane is 1 mil to 30 mils. In some embodiments, a thickness of the liquid applied membrane is 1 mil to 20 mils. In some embodiments, a thickness of the liquid applied membrane is 1 mil to 10 mils.

In some embodiments, a thickness of the liquid applied membrane is 10 mils to 200 mils. In some embodiments, a thickness of the liquid applied membrane is 20 mils to 200 mils. In some embodiments, a thickness of the liquid applied membrane is 30 mils to 200 mils. In some embodiments, a thickness of the liquid applied membrane is 40 mils to 200 mils. In some embodiments, a thickness of the liquid applied membrane is 50 mils to 200 mils. In some embodiments, a thickness of the liquid applied membrane is 60 mils to 200 mils. In some embodiments, a thickness of the liquid applied membrane is 70 mils to 200 mils. In some embodiments, a thickness of the liquid applied membrane is 80 mils to 200 mils. In some embodiments, a thickness of the liquid applied membrane is 90 mils to 200 mils. In some embodiments, a thickness of the liquid applied membrane is 100 mils to 200 mils. In some embodiments, a thickness of the liquid applied membrane is 110 mils to 200 mils. In some embodiments, a thickness of the liquid applied membrane is 120 mils to 200 mils. In some embodiments, a thickness of the liquid applied membrane is 130 mils to 200 mils. In some embodiments, a thickness of the liquid applied membrane is 140 mils to 200 mils. In some embodiments, a thickness of the liquid applied membrane is 150 mils to 200 mils. In some embodiments, a thickness of the liquid applied membrane is 160 mils to 200 mils. In some embodiments, a thickness of the liquid applied membrane is 170 mils to 200 mils. In some embodiments, a thickness of the liquid applied membrane is 180 mils to 200 mils. In some embodiments, a thickness of the liquid applied membrane is 190 mils to 200 mils. It will be appreciated that the thickness of the liquid applied membrane can be a thickness of the first membrane, without departing from the scope of this disclosure.

In some embodiments, the curing is performed at a temperature of 20° C. to 400° C. In some embodiments, the curing is performed at a temperature of 25° C. to 400° C. In some embodiments, the curing is performed at a temperature of 30° C. to 400° C. In some embodiments, the curing is performed at a temperature of 35° C. to 400° C. In some embodiments, the curing is performed at a temperature of 40° C. to 400° C. In some embodiments, the curing is performed at a temperature of 45° C. to 400° C. In some embodiments, the curing is performed at a temperature of 50° C. to 400° C. In some embodiments, the curing is performed at a temperature of 75° C. to 400° C. In some embodiments, the curing is performed at a temperature of 100° C. to 400° C. In some embodiments, the curing is performed at a temperature of 125° C. to 400° C. In some embodiments, the curing is performed at a temperature of 150° C. to 400° C. In some embodiments, the curing is performed at a temperature of 175° C. to 400° C. In some embodiments, the curing is performed at a temperature of 200° C. to 400° C. In some embodiments, the curing is performed at a temperature of 225° C. to 400° C. In some embodiments, the curing is performed at a temperature of 250° C. to 400° C. In some embodiments, the curing is performed at a temperature of 275° C. to 400° C. In some embodiments, the curing is performed at a temperature of 300° C. to 400° C. In some embodiments, the curing is performed at a temperature of 325° C. to 400° C. In some embodiments, the curing is performed at a temperature of 350° C. to 400° C. In some embodiments, the curing is performed at a temperature of 375° C. to 400° C.

In some embodiments, the curing is performed at a temperature of 20° C. to 375° C. In some embodiments, the curing is performed at a temperature of 20° C. to 350° C. In some embodiments, the curing is performed at a temperature of 20° C. to 325° C. In some embodiments, the curing is performed at a temperature of 20° C. to 300° C. In some embodiments, the curing is performed at a temperature of 20° C. to 275° C. In some embodiments, the curing is performed at a temperature of 20° C. to 250° C. In some embodiments, the curing is performed at a temperature of 20° C. to 225° C. In some embodiments, the curing is performed at a temperature of 20° C. to 200° C. In some embodiments, the curing is performed at a temperature of 20° C. to 175° C. In some embodiments, the curing is performed at a temperature of 20° C. to 150° C. In some embodiments, the curing is performed at a temperature of 20° C. to 125° C. In some embodiments, the curing is performed at a temperature of 20° C. to 100° C. In some embodiments, the curing is performed at a temperature of 20° C. to 75° C. In some embodiments, the curing is performed at a temperature of 20° C. to 50° C. In some embodiments, the curing is performed at a temperature of 20° C. to 45° C. In some embodiments, the curing is performed at a temperature of 20° C. to 40° C. In some embodiments, the curing is performed at a temperature of 20° C. to 35° C. In some embodiments, the curing is performed at a temperature of 20° C. to 30° C. In some embodiments, the curing is performed at a temperature of 20° C. to 25° C.

In some embodiments, the method of installation 100 comprises spraying 110 the aerosilizable composition at least onto at least a portion of the first membrane, so as to form a barrier membrane spray film.

As used herein, the term "spray film" refers to a continuous or non-continuous film of a substance having a structure of being sprayed onto a surface. For example, in some embodiments, the barrier membrane spray film is a continuous film. In some embodiments, the barrier membrane spray film is a noncontinuous or discontinuous film. In some embodiments, a spray film is a film formed of droplets located on a surface, wherein the droplets can coalesce to form a continuous film. In some embodiments, a spray film is a film formed of droplets located on a surface, wherein, in the absence of complete coalescence, the droplets form a discontinuous film. In some embodiments, the barrier membrane spray film is at least partially cured. In some embodiments, the barrier membrane spray film is substantially cured. In some embodiments, the barrier membrane spray film is fully cured. In some embodiments, when the barrier membrane spray film is at least partially cured, the barrier membrane spray film forms a seal between two surfaces, such as, for example, a surface of the membrane and a surface of the liquid applied membrane.

In some embodiments, spraying 110 comprises spraying the aerosilizable composition at least onto at least a portion of an outer surface of the first membrane, so as to form a barrier membrane spray film. In some embodiments, spraying 112 comprises aerosolizing the aerosilizable composition onto at least a portion of the outer surface of the first membrane. In some embodiments, spraying 112 comprises dispensing the aerosilizable composition from a spray device onto at least a portion of the outer surface of the first membrane. In some embodiments, spraying 112 comprises dispensing the aerosilizable composition from an aerosol container onto at least a portion of the outer surface of the first membrane. In some embodiments, spraying 112 comprises dispensing droplets of the aerosilizable composition onto at least a portion of the outer surface of the first membrane. In some embodiments, spraying 112 comprises dispersing droplets of the aerosilizable composition onto at least a portion of the outer surface of the first membrane. In some embodiments, spraying 112 comprises discharging droplets of the aerosilizable composition at least onto at least a portion of the outer surface of the first membrane. In some embodiments, spraying 112 comprises releasing droplets of the aerosilizable composition at least onto at least a portion of the outer surface of the first membrane. In some embodiments, a spray device comprises at least one of an aerosol sprayer, an aerosol container, an aerosol spray pump, a device comprising a spray nozzle, a device comprising a dispenser for spray delivery of the aerosilizable composition, a device comprising a hose, an aerosol spray gun, an atomizer device, a manual aerosol sprayer, an automatic aerosol sprayer, or any combination thereof.

In some embodiments, an average particle size of the sprayed aerosilizable composition is in a range of 0.001 microns to 10 microns. In some embodiments, an average particle size of the sprayed aerosilizable composition is in a range of 0.001 microns to 9 microns. In some embodiments, an average particle size of the sprayed aerosilizable composition is in a range of 0.001 microns to 8 microns. In some embodiments, an average particle size of the sprayed aerosilizable composition is in a range of 0.001 microns to 7 microns. In some embodiments, an average particle size of the sprayed aerosilizable composition is in a range of 0.001 microns to 6 microns. In some embodiments, an average particle size of the sprayed aerosilizable composition is in a range of 0.001 microns to 5 microns. In some embodiments, an average particle size of the sprayed aerosilizable composition is in a range of 0.001 microns to 4 microns. In some embodiments, an average particle size of the sprayed aerosilizable composition is in a range of 0.001 microns to 3 microns. In some embodiments, an average particle size of the sprayed aerosilizable composition is in a range of 0.001 microns to 2 microns. In some embodiments, an average particle size of the sprayed aerosilizable composition is in a range of 0.001 microns to 1 microns. In some embodiments, an average particle size of the sprayed aerosilizable composition is in a range of 0.001 microns to 0.9 microns. In some embodiments, an average particle size of the sprayed aerosilizable composition is in a range of 0.001 microns to 0.8 microns. In some embodiments, an average particle size of the sprayed aerosilizable composition is in a range of 0.001 microns to 0.7 microns. In some embodiments, an average particle size of the sprayed aerosilizable composition is in a range of 0.001 microns to 0.6 microns. In some embodiments, an average particle size of the sprayed aerosilizable composition is in a range of 0.001 microns to 0.5 microns. In some embodiments, an average particle size of the sprayed aerosilizable composition is in a range of 0.001 microns to 0.4 microns. In some embodiments, an average particle size of the sprayed aerosilizable composition is in a range of 0.001 microns to 0.3 microns. In some embodiments, an average particle size of the sprayed aerosilizable composition is in a range of 0.001 microns to 0.2 microns. In some embodiments, an average particle size of the sprayed aerosilizable composition is in a range of 0.001 microns to 0.1 microns. In some embodiments, an average particle size of the sprayed aerosilizable composition is in a range of 0.001 microns to 0.01 microns.

In some embodiments, an average particle size of the sprayed aerosilizable composition is in a range of 0.01 microns to 10 microns. In some embodiments, an average particle size of the sprayed aerosilizable composition is in a range of 0.1 microns to 10 microns. In some embodiments, an average particle size of the sprayed aerosilizable composition is in a range of 1 microns to 10 microns. In some embodiments, an average particle size of the sprayed aerosilizable composition is in a range of 2 microns to 10 microns. In some embodiments, an average particle size of the sprayed aerosilizable composition is in a range of 3 microns to 10 microns. In some embodiments, an average particle size of the sprayed aerosilizable composition is in a range of 4 microns to 10 microns. In some embodiments, an average particle size of the sprayed aerosilizable composition is in a range of 5 microns to 10 microns. In some embodiments, an average particle size of the sprayed aerosilizable composition is in a range of 6 microns to 10 microns. In some embodiments, an average particle size of the sprayed aerosilizable composition is in a range of 7 microns to 10 microns. In some embodiments, an average particle size of the sprayed aerosilizable composition is in a range of 8 microns to 10 microns. In some embodiments, an average particle size of the sprayed aerosilizable composition is in a range of 9 microns to 10 microns.

In some embodiments, the aerosilizable composition is sprayed on at least a portion of the outer surface of the first membrane. In some embodiments, the aerosilizable composition is bonded to at least a portion of the outer surface of the first membrane. In some embodiments, the aerosilizable composition is adhered to at least a portion of the outer surface of the first membrane. In some embodiments, the aerosilizable composition covers at least a portion of the outer surface of the first membrane. In some embodiments, the aerosilizable composition directly contacts at least a portion of the outer surface of the first membrane. In some embodiments, an intervening layer is located between the aerosilizable composition and the outer surface of the liquid applied membrane.

In some embodiments, the aerosilizable composition is sprayed onto at least a portion of an outer surface of an at least partially cured liquid applied membrane. In some embodiments, the aerosilizable composition is sprayed onto at least a portion of an outer surface of an at least substantially cured liquid applied membrane. In some embodiments, the aerosilizable composition is sprayed onto at least a portion of an outer surface of a fully cured liquid applied membrane. In some embodiments, the barrier membrane spray film is an uncured barrier membrane spray film. In some embodiments, the aerosilizable composition is sprayed onto at least a portion of the first surface portion of the building structure. In some embodiments, the aerosilizable composition is sprayed onto at least a portion of the second surface portion of the building structure. In some embodiments, the aerosilizable composition is sprayed onto at least a portion of the first surface portion of the building structure and onto at least a portion of the second surface portion of the building structure. In some embodiments, the second surface portion of the building structure is adjacent to the first surface portion of the building structure. In some embodiments, the second surface portion of the building structure abuts the first surface portion of the building structure.

In some embodiments, the aerosilizable composition is located on at least a portion of an edge portion of the first membrane. In some embodiments, the aerosilizable composition is located on at least a portion of a non-edge portion of the first membrane. In some embodiments, the aerosilizable composition is located on at least a portion of an edge portion of the first membrane and at least a portion of a non-edge portion of the first membrane. In some embodiments, the aerosilizable composition is located on a surface other than the outer surface of the first membrane. For example, in some embodiments, the aerosilizable composition is located on at least a portion of the second surface portion of the building structure. In some embodiments, the aerosilizable composition is located on at least a portion of the first surface portion of the building structure.

In some embodiments, the barrier membrane spray film covers 1% to 99% of the outer surface of the first membrane. In some embodiments, the barrier membrane spray film covers 1% to 90% of the outer surface of the first membrane. In some embodiments, the barrier membrane spray film covers 1% to 80% of the outer surface of the first membrane. In some embodiments, the barrier membrane spray film covers 1% to 70% of the outer surface of the first membrane. In some embodiments, the barrier membrane spray film covers 1% to 60% of the outer surface of the first membrane. In some embodiments, the barrier membrane spray film covers 1% to 50% of the outer surface of the first membrane. In some embodiments, the barrier membrane spray film covers 1% to 40% of the outer surface of the first membrane. In some embodiments, the barrier membrane spray film covers 1% to 30% of the outer surface of the first membrane. In some embodiments, the barrier membrane spray film covers 1% to 20% of the outer surface of the first membrane. In some embodiments, the barrier membrane spray film covers 1% to 10% of the outer surface of the first membrane.

In some embodiments, the barrier membrane spray film covers 5% to 99% of the outer surface of the first membrane. In some embodiments, the barrier membrane spray film covers 10% to 99% of the outer surface of the first membrane. In some embodiments, the barrier membrane spray film covers 20% to 99% of the outer surface of the first membrane. In some embodiments, the barrier membrane spray film covers 30% to 99% of the outer surface of the first membrane. In some embodiments, the barrier membrane spray film covers 40% to 99% of the outer surface of the first membrane. In some embodiments, the barrier membrane spray film covers 50% to 99% of the outer surface of the first membrane. In some embodiments, the barrier membrane spray film covers 60% to 99% of the outer surface of the first membrane. In some embodiments, the barrier membrane spray film covers 70% to 99% of the outer surface of the first membrane. In some embodiments, the barrier membrane spray film covers 80% to 99% of the outer surface of the first membrane. In some embodiments, the barrier membrane spray film covers 90% to 99% of the outer surface of the first membrane.

In some embodiments, a thickness of the barrier membrane spray film is less than a thickness of the first membrane. In some embodiments, a thickness of the barrier membrane spray film at an interface of the first membrane and the second membrane is less than a thickness of the first membrane.

In some embodiments, a thickness of the barrier membrane spray film is less than a thickness of the liquid applied membrane. In some embodiments, a thickness of the barrier membrane spray film at an interface of the liquid applied membrane and the membrane is less than a thickness of the liquid applied membrane.

In some embodiments, the barrier membrane spray film has a thickness of 1 mil to 10 mils. In some embodiments, the barrier membrane spray film has a thickness of 1 mil to 9 mils. In some embodiments, the barrier membrane spray film has a thickness of 1 mil to 8 mils. In some embodiments, the barrier membrane spray film has a thickness of 1 mil to 7 mils. In some embodiments, the barrier membrane spray film has a thickness of 1 mil to 6 mils. In some embodiments, the barrier membrane spray film has a thickness of 1 mil to 5 mils. In some embodiments, the barrier membrane spray film has a thickness of 1 mil to 4 mils. In some embodiments, the barrier membrane spray film has a thickness of 1 mil to 3 mils. In some embodiments, the barrier membrane spray film has a thickness of 1 mil to 2 mils.

In some embodiments, the barrier membrane spray film has a thickness of 2 mils to 10 mils. In some embodiments, the barrier membrane spray film has a thickness of 3 mils to 10 mils. In some embodiments, the barrier membrane spray film has a thickness of 4 mils to 10 mils. In some embodiments, the barrier membrane spray film has a thickness of 5 mils to 10 mils. In some embodiments, the barrier membrane spray film has a thickness of 6 mils to 10 mils. In some embodiments, the barrier membrane spray film has a thickness of 7 mils to 10 mils. In some embodiments, the barrier membrane spray film has a thickness of 8 mils to 10 mils. In some embodiments, the barrier membrane spray film has a thickness of 9 mils to 10 mils.

In some embodiments, the method of installation 100 comprises installing 112 the second membrane on the building structure.

In some embodiments, installing 112 comprises installing the second membrane on the building structure, such that the second membrane partially overlaps the first membrane in an overlapping portion. In some embodiments, installing 112 comprises installing the second membrane to the building structure, such that the barrier membrane spray film is located between the first membrane and the second membrane in the overlapping portion. In some embodiments, installing 112 comprises securing the second membrane to the building structure. In some embodiments, installing 112 comprises securing the second membrane to the building structure such that a first inner surface portion of the second membrane covers at least a portion of the second surface portion of the building structure and such that a second inner surface portion of the second membrane contacts at least a portion of the barrier membrane spray film. In some embodiments, installing 112 comprises at least contacting the first inner surface portion of the second membrane with the second surface portion of the building structure. In some embodiments, installing 112 comprises at least adhering the first inner surface portion of the second membrane to the second surface portion of the building structure. In some embodiments, installing 112 comprises at least bonding the first inner surface portion of the second membrane to the second surface portion of the building structure. In some embodiments, installing 112 comprises at least fastening the second membrane to the building structure using at least one mechanical fastener (e.g., a nail, a screw, a clip, etc.). In some embodiments, installing 112 comprises installing the second membrane on the building structure comprises adhering the second membrane to the building structure. In some embodiments, installing 112 comprises installing the second membrane on the building structure comprises mechanically fastening the second membrane to the building structure.

In some embodiments, installing 112 comprises at least contacting the second inner surface portion of the second membrane with at least one of at least a portion of the barrier membrane spray film, at least a portion of the outer surface of the first membrane, or any combination thereof. In some embodiments, installing 112 comprises at least adhering the second inner surface portion of the second membrane to at least one of at least a portion of the barrier membrane spray film, at least a portion of the outer surface of the first membrane, or any combination thereof. In some embodiments, installing 112 comprises at least bonding the second inner surface portion of the second membrane to at least one of at least a portion of the barrier membrane spray film, at least a portion of the outer surface of the first membrane, or any combination thereof. In some embodiments, installing 112 comprises at least fastening the second inner surface portion of the second membrane to at least one of at least a portion of the barrier membrane spray film, at least a portion of the outer surface of the first membrane, or any combination thereof, using at least one mechanical fastener (e.g., a nail, a screw, a clip, etc.). In some embodiments, installing 112 comprises at least applying the second inner surface portion of the second membrane onto at least one of at least a portion of the barrier membrane spray film, at least a portion of the outer surface of the first membrane, or any combination thereof. In some embodiments, installing 112 comprises at least pressing the second inner surface portion of the second membrane onto at least one of at least a portion of the barrier membrane spray film, at least a portion of the outer surface of the first membrane, or any combination thereof. In some embodiments, the second inner surface portion of the second membrane is pressed onto the barrier membrane spray film using a tool, such as, for example and without limitation, a roller, a scraper, or other similar tool. In some embodiments, the second inner surface portion of the second membrane is pressed onto the barrier membrane spray film by lightly or firmly touching the second membrane when the second membrane covers at least a portion of the barrier membrane spray film. In some embodiments, the second inner surface portion of the second membrane is secured to the building structure when the barrier membrane spray film is partially cured, substantially cured, or fully cured.

In some embodiments, the first inner surface portion of the second membrane is located on at least a portion of the second surface portion of the building structure. In some embodiments, the first inner surface portion of the second membrane covers at least a portion of the second surface portion of the building structure. In some embodiments, the first inner surface portion of the second membrane directly contacts at least a portion of the second surface portion of the building structure. In some embodiments, an intervening layer is located between the first inner surface portion of the second membrane and the second surface portion of the building structure.

In some embodiments, the second inner surface portion of the second membrane is located on at least a portion of at least one of at least a portion of the barrier membrane spray film, at least a portion of the outer surface of the first membrane, or any combination thereof. In some embodiments, the second inner surface portion of the second membrane covers at least one of at least a portion of the barrier membrane spray film, at least a portion of the outer surface of the first membrane, or any combination thereof. In some embodiments, the second inner surface portion of the second membrane directly contacts at least one of at least a portion of the barrier membrane spray film, at least a portion of the outer surface of the first membrane, or any combination thereof. In some embodiments, an intervening layer is located between the second inner surface portion of the second membrane and at least one of at least a portion of the barrier membrane spray film, at least a portion of the outer surface of the first membrane, or any combination thereof.

In some embodiments, the method of installation 100 comprises curing 114 the barrier membrane spray film.

In some embodiments, curing 114 comprises curing the barrier membrane spray film, so as to form a seal between the first membrane and the second membrane. In some embodiments, curing 114 the barrier membrane spray film comprises exposing the barrier membrane spray film to ambient conditions for a duration sufficient to at least partially cure the barrier membrane spray film. In some embodiments, curing 114 the barrier membrane spray film comprises heating the barrier membrane spray film to a temperature sufficient to at least partially cure the barrier membrane spray film. In some embodiments, curing 114 the barrier membrane spray film comprises exposing the barrier membrane spray film to water moisture sufficient to at least partially cure the barrier membrane spray film. In some embodiments, curing 114 the barrier membrane spray film comprises exposing the barrier membrane spray film to light (e.g., ultraviolet light, visible light, infrared light, etc.) sufficient to at least partially cure the barrier membrane spray film.

In some embodiments, curing 114 comprises curing the barrier membrane spray film, so as to form an at least partially cured barrier membrane spray film. In some embodiments, curing 114 comprises curing the barrier membrane spray film, so as to form an at least substantially cured barrier membrane spray film. In some embodiments, curing 114 comprises curing the barrier membrane spray film, so as to form a fully cured barrier membrane spray film. In some embodiments, curing 114 proceeds under conditions sufficient to at least partially cure the barrier membrane spray film. In some embodiments, curing 114 proceeds under conditions sufficient to substantially cure the barrier membrane spray film. In some embodiments, curing 114 proceeds under conditions sufficient to completely cure the barrier membrane spray film. In some embodiments, the barrier membrane spray film is a cured barrier membrane spray film.

In some embodiments, the seal comprises the cured barrier membrane spray film. As used herein, the term "seal" refers to a barrier. In some embodiments, the seal is a waterproof barrier. In some embodiments, the seal is a water-resistant barrier. In some embodiments, the seal is a barrier to water. In some embodiments, the seal is a barrier to water moisture. In some embodiments, the seal is a barrier to water vapor. In some embodiments, the seal is a barrier to air. In some embodiments, the seal is permeable, semi-impermeable, or impermeable to water vapor.

In some embodiments, the curing 114 is performed at a temperature of 20° C. to 400° C. In some embodiments, the curing 114 is performed at a temperature of 25° C. to 400° C. In some embodiments, the curing 114 is performed at a temperature of 30° C. to 400° C. In some embodiments, the curing 114 is performed at a temperature of 35° C. to 400° C. In some embodiments, the curing 114 is performed at a temperature of 40° C. to 400° C. In some embodiments, the curing 114 is performed at a temperature of 45° C. to 400° C. In some embodiments, the curing 114 is performed at a temperature of 50° C. to 400° C. In some embodiments, the curing 114 is performed at a temperature of 75° C. to 400° C. In some embodiments, the curing 114 is performed at a temperature of 100° C. to 400° C. In some embodiments, the curing 114 is performed at a temperature of 125° C. to 400° C. In some embodiments, the curing 114 is performed at a temperature of 150° C. to 400° C. In some embodiments, the curing 114 is performed at a temperature of 175° C. to 400° C. In some embodiments, the curing 114 is performed at a temperature of 200° C. to 400° C. In some embodiments, the curing 114 is performed at a temperature of 225° C. to 400° C. In some embodiments, the curing 114 is performed at a temperature of 250° C. to 400° C. In some embodiments, the curing 114 is performed at a temperature of 275° C. to 400° C. In some embodiments, the curing 114 is performed at a temperature of 300° C. to 400° C. In some embodiments, the curing 114 is performed at a temperature of 325° C. to 400° C. In some embodiments, the curing 114 is performed at a temperature of 350° C. to 400° C. In some embodiments, the curing 114 is performed at a temperature of 375° C. to 400° C.

In some embodiments, the curing 114 is performed at a temperature of 20° C. to 375° C. In some embodiments, the curing 114 is performed at a temperature of 20° C. to 350° C. In some embodiments, the curing 114 is performed at a temperature of 20° C. to 325° C. In some embodiments, the curing 114 is performed at a temperature of 20° C. to 300° C. In some embodiments, the curing 114 is performed at a temperature of 20° C. to 275° C. In some embodiments, the curing 114 is performed at a temperature of 20° C. to 250° C. In some embodiments, the curing 114 is performed at a temperature of 20° C. to 225° C. In some embodiments, the curing 114 is performed at a temperature of 20° C. to 200° C. In some embodiments, the curing 114 is performed at a temperature of 20° C. to 175° C. In some embodiments, the curing 114 is performed at a temperature of 20° C. to 150° C. In some embodiments, the curing 114 is performed at a temperature of 20° C. to 125° C. In some embodiments, the curing 114 is performed at a temperature of 20° C. to 100° C. In some embodiments, the curing 114 is performed at a temperature of 20° C. to 75° C. In some embodiments, the curing 114 is performed at a temperature of 20° C. to 50° C. In some embodiments, the curing 114 is performed at a temperature of 20° C. to 45° C. In some embodiments, the curing 114 is performed at a temperature of 20° C. to 40° C. In some embodiments, the curing 114 is performed at a temperature of 20° C. to 35° C. In some embodiments, the curing 114 is performed at a temperature of 20° C. to 30° C. In some embodiments, the curing 114 is performed at a temperature of 20° C. to 25° C.

Some embodiments relate to a barrier system. For example, in some embodiments, the barrier system is a barrier system installed according to any one of the methods disclosed herein, including, such as for example and without limitation, the method of installation 100 of FIGS. 1A-1B. In some embodiments, for example, the barrier system comprises a liquid applied membrane. In some embodiments, the liquid applied membrane is located on at least a portion of a first surface portion of a building structure. In some embodiments, the liquid applied membrane has an outer surface. In some embodiments, the barrier system comprises a cured barrier membrane spray film. In some embodiments, the cured barrier membrane spray film is located on at least a portion of the outer surface of the liquid applied membrane. In some embodiments, the cured barrier membrane spray film comprises a crosslinked silyl-terminated polymer. In some embodiments, the barrier system comprises a membrane. In some embodiments, the membrane is secured to the building structure. In some embodiments, the membrane has an inner surface and an outer surface. In some embodiments, the inner surface of the membrane has a first inner surface portion and a second inner surface portion. In some embodiments, the first inner surface portion of the membrane covers a second surface portion of the building structure. In some embodiments, the second inner surface portion of the membrane contacts at least a portion of the cured barrier membrane spray film. It will be appreciated that any of the liquid applied membranes, barrier membrane spray films, and membranes disclosed herein may be employed without departing from the scope of this disclosure.

Some embodiments relate to a device. In some embodiments, the device comprises a container. In some embodiments, the device comprises a pressurized container. In some embodiments, the device comprises an aerosol container. In some embodiments, the device comprises any one or more of the aerosilizable compositions disclosed herein. For example, in some embodiments, the aerosilizable composition comprises a sprayable moisture-curable composition. In some embodiments, the sprayable moisture-curable composition comprises at least one propellant; at least one crosslinker; at least one plasticizer; and at least 60% by weight of a solid silicon-containing polymer based on a total weight of the sprayable moisture-curable composition. In some embodiments, the aerosilizable composition is contained in the container.

In some embodiments, the device is configured to discharge the aerosilizable composition from the container onto a surface, so as to form a spray film. In some embodiments, the device is configured to aerosolize the aerosilizable composition. In some embodiments, the device is configured to spray the aerosilizable composition. In some embodiments, the device is configured to dispense the aerosilizable composition. In some embodiments, the device is configured to dispense droplets of the aerosilizable composition. In some embodiments, the device is configured to disperse droplets of the aerosilizable composition. In some embodiments, the device is configured to discharge droplets the aerosilizable composition. In some embodiments, the device is configured to release droplets of the aerosilizable composition. In some embodiments, the device comprises at least one of a spray device, an aerosol sprayer, an aerosol container, an aerosol spray pump, a device comprising a spray nozzle, a device comprising a dispenser for spray delivery of the aerosilizable composition, a device comprising a hose, an aerosol spray gun, an atomizer device, a manual aerosol sprayer, an automatic aerosol sprayer, or any combination thereof.

Some embodiments relate to a system. In some embodiments, the system comprises a building structure. In some embodiments, the building structure comprises any one or more of the building structures disclosed herein. In some embodiments, the building structure comprises a roofing substrate. In some embodiments, the roofing substrate comprises any one or more of the roofing substrates disclosed herein. In some embodiments, the system comprises a cured spray film. In some embodiments, the cured spray film comprises any one or more of the barrier membrane spray films disclosed herein. In some embodiments, the system comprises a roofing membrane. In some embodiments, the roofing membrane comprises any one or more of the roofing membrane disclosed herein. In some embodiments, for example, the roofing membrane comprises at least one of a thermoplastic polyolefin (TPO), a polyvinyl chloride (PVC), a poly(styrene butadiene styrene), or any combination thereof. In some embodiments, the cured spray film is located between the roofing substrate and the roofing membrane. In some embodiments, the cured spray film adheres the roofing substrate to the roofing membrane. In some embodiments, the cured spray film directly contacts the roofing substrate. In some embodiments, the cured spray film directly contacts the roofing membrane. In some embodiments, the system does not comprise the roofing membrane. In some embodiments, when the system does not comprise the roofing membrane, the cured spray film is a coating.

FIG. 2 is a schematic diagram of a plan view of a barrier system, according to some embodiments. As shown in FIG. 2, in some embodiments, the barrier system 200 comprises a liquid applied membrane 202 located on at least a portion of a first surface portion of a building structure 204. In some embodiments, the barrier system 200 comprises a membrane 206 secured to the building structure 204. In some embodiments, a first inner surface portion of the membrane 206 covers at least a portion of a second surface portion of the building structure 204. In some embodiments, a second inner surface portion of the membrane 206 covers and/or overlaps at least a portion of an outer surface of the liquid applied membrane 202. In some embodiments, the barrier system 200 comprises a cured barrier membrane spray film 208 located between at least a portion of the overlapping portion of the liquid applied membrane 202 and the membrane 206. In some embodiments, the cured barrier membrane spray film 208 contacts at least a portion of the liquid applied membrane 202 and at least a portion of the membrane 206 so as to form a seal between the liquid applied membrane 202 and the membrane 206. Although not shown, it will be appreciated that, in other embodiments, the liquid applied membrane 202 can cover and/or overlap at least a portion of the membrane 208, with the cured barrier membrane spray film located between at least a portion of the overlapping portion of the liquid applied membrane and the membrane.

In some embodiments, the liquid applied membrane 202 is a first membrane. In some embodiments, the membrane 206 is a second membrane. In some embodiments, the first membrane and the second membrane are located on the building structure, such that the second membrane partially overlaps the first membrane in an overlapping portion. In some embodiments, a cured barrier membrane spray film is located between the first membrane and the second membrane in the overlapping portion. In some embodiments, the first membrane and the second membrane are same or similar. In some embodiments, the first membrane and the second membrane are different. In some embodiments, the cured barrier membrane spray film contacts, in the overlapping portion, the first membrane or the second membrane. In some embodiments, the cured barrier membrane spray film contacts, in the overlapping portion, the first membrane and the second membrane. In some embodiments, the cured barrier membrane spray film forms a watertight seal located between the first membrane and the second membrane.

Figure 3:
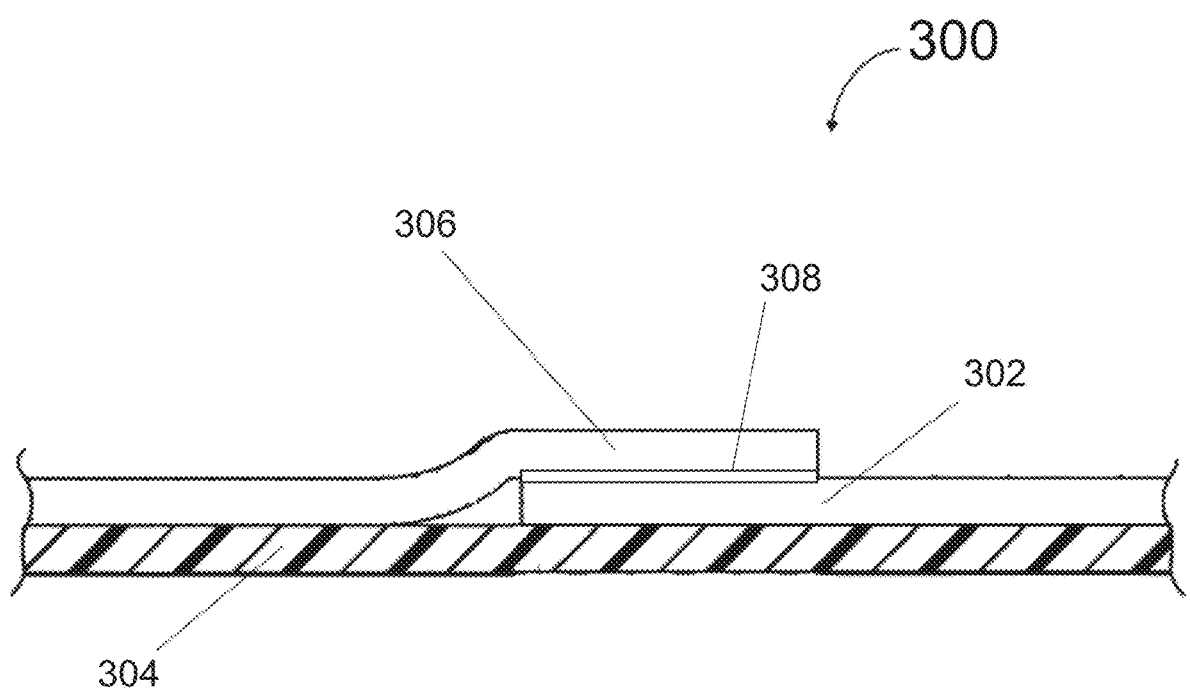

FIG. 3 is a schematic diagram of a cross-sectional view of a barrier system 300, according to some embodiments. As shown in FIG. 3, the barrier system 300 comprises a liquid applied membrane 302 located on at least a portion of a first surface portion of a building structure 304. In some embodiments, the barrier system 300 comprises a membrane 306 secured to the building structure 304. In some embodiments, a first inner surface portion of the membrane 306 covers at least a portion of a second surface portion of the building structure 304. In some embodiments, a second inner surface portion of the membrane 306 covers and/or overlaps at least a portion of the liquid applied membrane 302. In some embodiments, the barrier system 300 comprises a cured membrane barrier spray film 308 located between at least a portion of the overlapping portion of the liquid applied membrane 302 and the membrane 306. In some embodiments, the cured barrier membrane spray film 308 contacts at least a portion of the liquid applied membrane 302 and at least a portion of the membrane 306 so as to form a seal between the liquid applied membrane 302 and the membrane 306. Although not shown, in some embodiments, the liquid applied membrane 302 covers and/or overlaps at least a portion of the membrane 308.

In some embodiments, the liquid applied membrane 302 is a first membrane. In some embodiments, the membrane 306 is a second membrane. In some embodiments, the first membrane and the second membrane are located on the building structure, such that the second membrane partially overlaps the first membrane in an overlapping portion. In some embodiments, a cured barrier membrane spray film is located between the first membrane and the second membrane in the overlapping portion. In some embodiments, the first membrane and the second membrane are same or similar. In some embodiments, the first membrane and the second membrane are different. In some embodiments, the cured barrier membrane spray film contacts, in the overlapping portion, the first membrane or the second membrane. In some embodiments, the cured barrier membrane spray film contacts, in the overlapping portion, the first membrane and the second membrane. In some embodiments, the cured barrier membrane spray film forms a watertight seal located between the first membrane and the second membrane.

Figure 4:
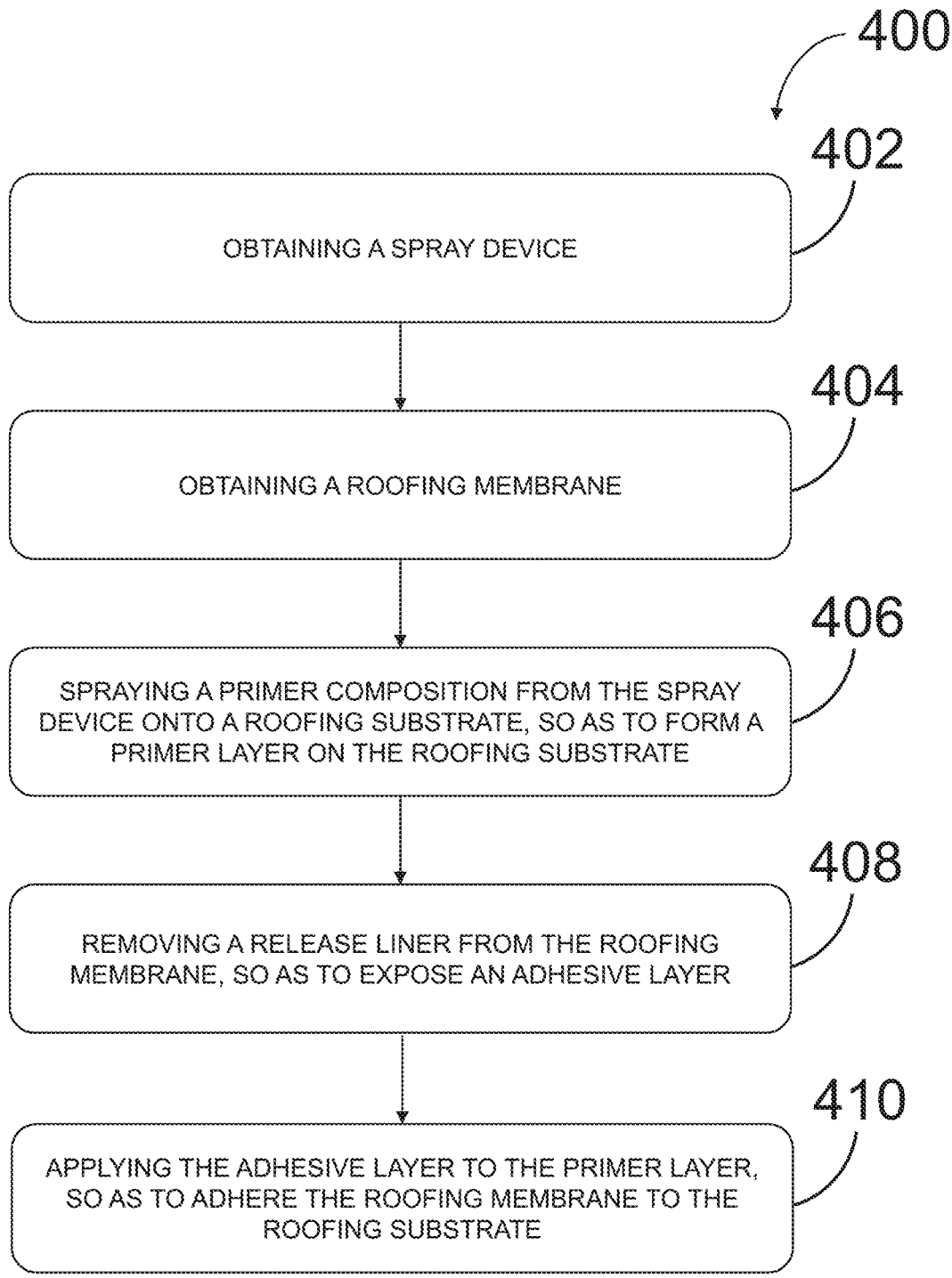

FIG. 4 is a flowchart of a method of installation 400, according to some embodiments. As shown in FIG. 4, in some embodiments, the method of installation 400 comprises one or more of the following steps: obtaining 402 a spray device; obtaining 404 a roofing membrane; spraying 406 a primer composition from the spray device onto a roofing substrate, so as to form a primer layer on the roofing substrate; removing 408 a release liner from the roofing membrane, so as to expose an adhesive layer; and applying 410 the adhesive layer to the primer layer, so as to adhere the roofing membrane to the roofing substrate.

In some embodiments, the method of installation 400 comprises obtaining 402 a spray device.

In some embodiments, the obtaining 402 comprising obtaining a spray device comprising a container, wherein the container contains a primer composition. In some embodiments, the obtaining 402 comprises obtaining a spray device comprising a sprayer, and a container, wherein the container is connected to the sprayer, wherein the container contains a primer composition. In some embodiments, the obtaining 402 comprises obtaining a sprayer, obtaining a container, and assembling a spray device, wherein the spray device comprises the container connected to the sprayer, wherein the container comprises a primer composition. In some embodiments, the assembling the spray device comprises connecting the container to the sprayer. In some embodiments, the assembling the spray device comprises fluidly coupling the container to the sprayer. In some embodiments, the assembling the spray device comprises connecting the container and the sprayer via a tube. Any one or more of the spray devices disclosed herein may be used without departing from the scope of this disclosure. For simplicity, the spray devices are not repeated here.

In some embodiments, the container of the spray device comprises a first chamber and a second chamber, wherein the first chamber and the second chamber are fluidly isolated. In some embodiments, the container of the spray device comprises a first chamber and a second chamber, wherein the first chamber and the second chamber are configurable between a fluidly isolated state and a non-fluidly isolated state. In some embodiments, the container of the spray device comprises a reservoir of an aerosol container. In some embodiments, the container of the spray device comprises a canister. In some embodiments, the container of the spray device comprises a cylinder. In some embodiments, the container of the spray device comprises a valve assembly. In some embodiments, the valve assembly comprises a valve, an inlet, and an outlet, wherein the outlet is configured to be fluidly coupled to the sprayer, optionally via a hose or a tube. In some embodiments, the container of the spray device comprises a bottle.

In some embodiments, the container has a volume of 2 fluid ounces to 30 fluid ounces. In some embodiments, the container has a volume of 2 fluid ounces to 28 fluid ounces. In some embodiments, the container has a volume of 2 fluid ounces to 26 fluid ounces. In some embodiments, the container has a volume of 2 fluid ounces to 25 fluid ounces. In some embodiments, the container has a volume of 2 fluid ounces to 24 fluid ounces. In some embodiments, the container has a volume of 2 fluid ounces to 22 fluid ounces. In some embodiments, the container has a volume of 2 fluid ounces to 20 fluid ounces. In some embodiments, the container has a volume of 2 fluid ounces to 18 fluid ounces. In some embodiments, the container has a volume of 2 fluid ounces to 16 fluid ounces. In some embodiments, the container has a volume of 2 fluid ounces to 15 fluid ounces. In some embodiments, the container has a volume of 2 fluid ounces to 14 fluid ounces. In some embodiments, the container has a volume of 2 fluid ounces to 12 fluid ounces. In some embodiments, the container has a volume of 2 fluid ounces to 10 fluid ounces. In some embodiments, the container has a volume of 2 fluid ounces to 8 fluid ounces. In some embodiments, the container has a volume of 2 fluid ounces to 6 fluid ounces. In some embodiments, the container has a volume of 2 fluid ounces to 5 fluid ounces. In some embodiments, the container has a volume of 2 fluid ounces to 4 fluid ounces.

In some embodiments, the container has a volume of 4 fluid ounces to 30 fluid ounces. In some embodiments, the container has a volume of 6 fluid ounces to 30 fluid ounces. In some embodiments, the container has a volume of 8 fluid ounces to 30 fluid ounces. In some embodiments, the container has a volume of 10 fluid ounces to 30 fluid ounces. In some embodiments, the container has a volume of 12 fluid ounces to 30 fluid ounces. In some embodiments, the container has a volume of 14 fluid ounces to 30 fluid ounces. In some embodiments, the container has a volume of 16 fluid ounces to 30 fluid ounces. In some embodiments, the container has a volume of 18 fluid ounces to 30 fluid ounces. In some embodiments, the container has a volume of 20 fluid ounces to 30 fluid ounces. In some embodiments, the container has a volume of 22 fluid ounces to 30 fluid ounces. In some embodiments, the container has a volume of 24 fluid ounces to 30 fluid ounces. In some embodiments, the container has a volume of 26 fluid ounces to 30 fluid ounces. In some embodiments, the container has a volume of 28 fluid ounces to 30 fluid ounces.

In some embodiments, the container has a volume of 0.5 gallons to 30 gallons. In some embodiments, the container has a volume of 0.5 gallons to 28 gallons. In some embodiments, the container has a volume of 0.5 gallons to 26 gallons. In some embodiments, the container has a volume of 0.5 gallons to 25 gallons. In some embodiments, the container has a volume of 0.5 gallons to 24 gallons. In some embodiments, the container has a volume of 0.5 gallons to 22 gallons. In some embodiments, the container has a volume of 0.5 gallons to 20 gallons. In some embodiments, the container has a volume of 0.5 gallons to 18 gallons. In some embodiments, the container has a volume of 0.5 gallons to 16 gallons. In some embodiments, the container has a volume of 0.5 gallons to 15 gallons. In some embodiments, the container has a volume of 0.5 gallons to 14 gallons. In some embodiments, the container has a volume of 0.5 gallons to 12 gallons. In some embodiments, the container has a volume of 0.5 gallons to 10 gallons. In some embodiments, the container has a volume of 0.5 gallons to 8 gallons. In some embodiments, the container has a volume of 0.5 gallons to 6 gallons. In some embodiments, the container has a volume of 0.5 gallons to 5 gallons. In some embodiments, the container has a volume of 0.5 gallons to 4 gallons. In some embodiments, the container has a volume of 0.5 gallons to 2 gallons. In some embodiments, the container has a volume of 0.1 gallons to 1 gallon.

In some embodiments, the container has a volume of 2 gallons to 30 gallons. In some embodiments, the container has a volume of 4 gallons to 30 gallons. In some embodiments, the container has a volume of 6 gallons to 30 gallons.

In some embodiments, the container has a volume of 8 gallons to 30 gallons. In some embodiments, the container has a volume of 10 gallons to 30 gallons. In some embodiments, the container has a volume of 12 gallons to 30 gallons. In some embodiments, the container has a volume of 14 gallons to 30 gallons. In some embodiments, the container has a volume of 16 gallons to 30 gallons. In some embodiments, the container has a volume of 18 gallons to 30 gallons. In some embodiments, the container has a volume of 20 gallons to 30 gallons. In some embodiments, the container has a volume of 22 gallons to 30 gallons. In some embodiments, the container has a volume of 24 gallons to 30 gallons. In some embodiments, the container has a volume of 26 gallons to 30 gallons. In some embodiments, the container has a volume of 28 gallons to 30 gallons.

In some embodiments, the method of installation 400 comprises obtaining 404 a roofing membrane.

In some embodiments, the roofing membrane comprises any one or more of the membranes disclosed herein. For example, in some embodiments, the roofing membrane comprises a single-ply membrane. In some embodiments, the roofing membrane comprises a double-ply or two-ply membrane. In some embodiments, the roofing membrane comprises a multi-ply membrane. In some embodiments, the roofing membrane comprises a reinforcement. For example, in some embodiments, the roofing membrane is a reinforced membrane. In some embodiments, the reinforcement comprises at least one of a scrim, a woven fabric, a non-woven fabric, a metal foil, a fiberglass mat, a polyester mat, a spunbond mat, or any combination thereof. In some embodiments, the roofing membrane comprises at least one sheet. In some embodiments, the roofing membrane comprises only one sheet. In some embodiments, the roofing membrane comprises a plurality of sheets. In some embodiments, the roofing membrane comprises a cover tape.

In some embodiments, the roofing membrane comprises a first layer. In some embodiments, the first layer comprises at least one polymer. In some embodiments, the first layer comprises at least one of a thermoplastic polyolefin (TPO), a polyvinylchloride (PVC), an ethylene-propylene diene monomer (EPDM), a silyl-terminated polymer, a polysiloxane, or any combination thereof. In some embodiments, the roofing membrane is a thermoplastic polyolefin (TPO) membrane. In some embodiments, the roofing membrane is a polyvinyl chloride (PVC) membrane. In some embodiments, the roofing membrane is an ethylene propylene diene monomer (EPDM) membrane. In some embodiments, the roofing membrane is a silyl-terminated polymer membrane. In some embodiments, the roofing membrane is a silicone membrane. In some embodiments, the roofing membrane comprises a thermoplastic polymer.

In some embodiments, the roofing membrane comprises an adhesive layer. In some embodiments, the adhesive layer is located on at least one surface of the membrane. In some embodiments, the adhesive layer is configured to adhere the membrane to a surface, such as, for example and without limitation, a surface of a building structure. In some embodiments, the adhesive layer is located on the first layer. In some embodiments, the adhesive layer is located between the first layer and a release liner. In some embodiments, the adhesive layer directly contacts the first layer. In some embodiments, the adhesive layer covers a portion of the first layer. In some embodiments, the adhesive layer covers at least a portion of the first layer. In some embodiments, the adhesive layer covers the first layer in its entirety. In some embodiments, the adhesive layer is adhered to the first layer. In some embodiments, the adhesive layer impregnates the first layer. In some embodiments, the adhesive layer is pressed, under heat and/or pressure, into the first layer. In some embodiments, the adhesive layer is laminated to the first layer. In some embodiments, an intervening layer is located between the adhesive layer and the first layer.

In some embodiments, the adhesive layer has a thickness of 1 mil to 200 mils. In some embodiments, the adhesive layer has a thickness of 10 mil to 200 mils. In some embodiments, the adhesive layer has a thickness of 20 mil to 200 mils. In some embodiments, the adhesive layer has a thickness of 30 mil to 200 mils. In some embodiments, the adhesive layer has a thickness of 40 mil to 200 mils. In some embodiments, the adhesive layer has a thickness of 50 mil to 200 mils. In some embodiments, the adhesive layer has a thickness of 60 mil to 200 mils. In some embodiments, the adhesive layer has a thickness of 70 mil to 200 mils. In some embodiments, the adhesive layer has a thickness of 80 mil to 200 mils. In some embodiments, the adhesive layer has a thickness of 90 mil to 200 mils. In some embodiments, the adhesive layer has a thickness of 100 mil to 200 mils. In some embodiments, the adhesive layer has a thickness of 110 mil to 200 mils. In some embodiments, the adhesive layer has a thickness of 120 mil to 200 mils. In some embodiments, the adhesive layer has a thickness of 130 mil to 200 mils. In some embodiments, the adhesive layer has a thickness of 140 mil to 200 mils. In some embodiments, the adhesive layer has a thickness of 150 mil to 200 mils. In some embodiments, the adhesive layer has a thickness of 160 mil to 200 mils. In some embodiments, the adhesive layer has a thickness of 170 mil to 200 mils. In some embodiments, the adhesive layer has a thickness of 180 mil to 200 mils. In some embodiments, the adhesive layer has a thickness of 190 mil to 200 mils.

In some embodiments, the adhesive layer has a thickness of 1 mil to 190 mils. In some embodiments, the adhesive layer has a thickness of 1 mil to 180 mils. In some embodiments, the adhesive layer has a thickness of 1 mil to 170 mils. In some embodiments, the adhesive layer has a thickness of 1 mil to 160 mils. In some embodiments, the adhesive layer has a thickness of 1 mil to 150 mils. In some embodiments, the adhesive layer has a thickness of 1 mil to 140 mils. In some embodiments, the adhesive layer has a thickness of 1 mil to 130 mils. In some embodiments, the adhesive layer has a thickness of 1 mil to 120 mils. In some embodiments, the adhesive layer has a thickness of 1 mil to 110 mils. In some embodiments, the adhesive layer has a thickness of 1 mil to 100 mils. In some embodiments, the adhesive layer has a thickness of 1 mil to 90 mils. In some embodiments, the adhesive layer has a thickness of 1 mil to 80 mils. In some embodiments, the adhesive layer has a thickness of 1 mil to 70 mils. In some embodiments, the adhesive layer has a thickness of 1 mil to 60 mils. In some embodiments, the adhesive layer has a thickness of 1 mil to 50 mils. In some embodiments, the adhesive layer has a thickness of 1 mil to 40 mils. In some embodiments, the adhesive layer has a thickness of 1 mil to 30 mils. In some embodiments, the adhesive layer has a thickness of 1 mil to 20 mils. In some embodiments, the adhesive layer has a thickness of 1 mil to 10 mils.

In some embodiments, the adhesive layer comprises at least one adhesive. In some embodiments, the at least one adhesive comprises at least one of a hot melt adhesive, a solvent-based adhesive, a pressure sensitive adhesive, a water-based adhesive, a UV cured or UV curable polymer, or any combination thereof. In some embodiments, the at least one adhesive comprises at least one of an asphaltic adhesive, a butyl adhesive, a silicone adhesive, an acrylic adhesive, a synthetic thermoplastic elastomer, a natural rubber, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the at least one adhesive comprises at one elastomer. In some embodiments, the at least one elastomer comprises at least one of a butyl rubber, a styrenic block copolymer, or any combination thereof.

In some embodiments, the at least one adhesive comprises at least one of an asphaltic adhesive, a butyl adhesive, a silicone adhesive, an epoxy adhesive, a polyurethane adhesive, an acrylic adhesive, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acrylic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

In some embodiments, the roofing membrane has a thickness of 1 mil to 200 mils. In some embodiments, the roofing membrane has a thickness of 10 mils to 200 mils. In some embodiments, the roofing membrane has a thickness of 20 mils to 200 mils. In some embodiments, the roofing membrane has a thickness of 30 mils to 200 mils. In some embodiments, the roofing membrane has a thickness of 40 mils to 200 mils. In some embodiments, the roofing membrane has a thickness of 50 mils to 200 mils. In some embodiments, the roofing membrane has a thickness of 60 mils to 200 mils. In some embodiments, the roofing membrane has a thickness of 70 mils to 200 mils. In some embodiments, the roofing membrane has a thickness of 80 mils to 200 mils. In some embodiments, the roofing membrane has a thickness of 90 mils to 200 mils. In some embodiments, the roofing membrane has a thickness of 100 mils to 200 mils. In some embodiments, the roofing membrane has a thickness of 110 mils to 200 mils. In some embodiments, the roofing membrane has a thickness of 120 mils to 200 mils. In some embodiments, the roofing membrane has a thickness of 130 mils to 200 mils. In some embodiments, the roofing membrane has a thickness of 140 mils to 200 mils. In some embodiments, the roofing membrane has a thickness of 150 mils to 200 mils. In some embodiments, the roofing membrane has a thickness of 160 mils to 200 mils. In some embodiments, the roofing membrane has a thickness of 170 mils to 200 mils. In some embodiments, the roofing membrane has a thickness of 180 mils to 200 mils. In some embodiments, the roofing membrane has a thickness of 190 mils to 200 mils.

In some embodiments, the roofing membrane has a thickness of 1 mil to 190 mils. In some embodiments, the roofing membrane has a thickness of 1 mil to 180 mils. In some embodiments, the roofing membrane has a thickness of 1 mil to 170 mils. In some embodiments, the roofing membrane has a thickness of 1 mil to 160 mils. In some embodiments, the roofing membrane has a thickness of 1 mil to 150 mils. In some embodiments, the roofing membrane has a thickness of 1 mil to 140 mils. In some embodiments, the roofing membrane has a thickness of 1 mil to 130 mils. In some embodiments, the roofing membrane has a thickness of 1 mil to 120 mils. In some embodiments, the roofing membrane has a thickness of 1 mil to 110 mils. In some embodiments, the roofing membrane has a thickness of 1 mil to 100 mils. In some embodiments, the roofing membrane has a thickness of 1 mil to 90 mils. In some embodiments, the roofing membrane has a thickness of 1 mil to 80 mils. In some embodiments, the roofing membrane has a thickness of 1 mil to 70 mils. In some embodiments, the roofing membrane has a thickness of 1 mil to 60 mils. In some embodiments, the roofing membrane has a thickness of 1 mil to 50 mils. In some embodiments, the roofing membrane has a thickness of 1 mil to 40 mils. In some embodiments, the roofing membrane has a thickness of 1 mil to 30 mils. In some embodiments, the roofing membrane has a thickness of 1 mil to 20 mils. In some embodiments, the roofing membrane has a thickness of 1 mil to 10 mils.

In some embodiments, the method of installation 400 comprises spraying 406 a primer composition from the spray device onto a roofing substrate, so as to form a primer layer on the roofing substrate.

In some embodiments, the spraying 406 comprises aerosolizing the primer composition onto the roofing substrate. In some embodiments, the spraying 406 comprises dispensing the primer composition from a spray device onto the roofing substrate. In some embodiments, the spraying 406 comprises dispensing the primer composition from an aerosol container onto the roofing substrate. In some embodiments, the spraying 406 comprises dispensing droplets of the primer composition onto the roofing substrate. In some embodiments, the spraying 406 comprises dispersing droplets of the primer composition onto the roofing substrate. In some embodiments, the spraying 406 comprises discharging droplets of the primer composition at least onto the roofing substrate. In some embodiments, the spraying 406 comprises releasing droplets of the primer composition at least the roofing substrate. In some embodiments, the spraying 406 comprises discharging the primer composition through a spray nozzle. In some embodiments, the spraying 406 comprises atomizing the primer composition. In some embodiments, the spraying 406 comprises siphoning the primer composition from the container to the sprayer. In some embodiments, the method does not comprise rolling the primer composition onto the roofing substrate. In some embodiments, the method does not comprise brushing the primer composition onto the roofing substrate. In some embodiments, the method does not comprise spreading the primer composition onto the roofing substrate.

In some embodiments, the primer composition comprises at least one of a water-based primer, a solvent-based primer, or any combination thereof. In some embodiments, the primer composition comprises a propellant. Any one or more of the propellants disclosed herein may be used, without departing from the scope of this disclosure. For simplicity, the propellants are not repeated here. In some embodiments, the primer composition comprises at least one of a halogenated butyl rubber, an acrylic, an epoxy, a heptane, a toluene, a methyl alcohol, a hexane, a xylene, a methyl ethyl ketone, a diphenyl methane diisocyanate, a polymethylene polyphenol isocyanate, an ethyl benzene, a naphtha, a hydrocarbon resin, or any combination thereof. In some embodiments, the primer composition is a low-VOC primer composition. In some embodiments, the primer composition does not comprise VOCs. In some embodiments, the primer composition is substantially free of VOCs. In some embodiments, the primer composition is free of VOCs.

In some embodiments, the roofing substrate comprises at least one of a reinforcement layer, a support layer, an asphaltic substrate, a plywood substrate, a glass substrate, a cellulosic substrate, an underlayment, a roofing substrate, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a roof shingle, a mesh, a fleece, a mat, a fabric, a glass mat, a fiberglass mat, a woven mat, a nonwoven mat, a polyester mat, a scrim, a coated scrim, a spunbond mat, a spunlaced mat, an airlaid mat, a meltblown mat, an edge metal, or any combination thereof. In some embodiments, the roofing substrate comprises at least one of masonry, concrete, wood, plywood, asphalt, gypsum, metal, or any combination thereof.

In some embodiments, the primer layer has a thickness of 1 mil to 100 mils. In some embodiments, the primer layer has a thickness of 1 mil to 90 mils. In some embodiments, the primer layer has a thickness of 1 mil to 80 mils. In some embodiments, the primer layer has a thickness of 1 mil to 70 mils. In some embodiments, the primer layer has a thickness of 1 mil to 60 mils. In some embodiments, the primer layer has a thickness of 1 mil to 50 mils. In some embodiments, the primer layer has a thickness of 1 mil to 40 mils. In some embodiments, the primer layer has a thickness of 1 mil to 30 mils. In some embodiments, the primer layer has a thickness of 1 mil to 20 mils. In some embodiments, the primer layer has a thickness of 1 mil to 18 mils. In some embodiments, the primer layer has a thickness of 1 mil to 16 mils. In some embodiments, the primer layer has a thickness of 1 mil to 15 mils. In some embodiments, the primer layer has a thickness of 1 mil to 14 mils. In some embodiments, the primer layer has a thickness of 1 mil to 12 mils. In some embodiments, the primer layer has a thickness of 1 mil to 10 mils. In some embodiments, the primer layer has a thickness of 1 mil to 8 mils. In some embodiments, the primer layer has a thickness of 1 mil to 6 mils. In some embodiments, the primer layer has a thickness of 1 mil to 5 mils. In some embodiments, the primer layer has a thickness of 1 mil to 4 mils. In some embodiments, the primer layer has a thickness of 1 mil to 2 mils.

In some embodiments, the primer layer has a thickness of 10 mils to 100 mils. In some embodiments, the primer layer has a thickness of 20 mils to 100 mils. In some embodiments, the primer layer has a thickness of 30 mils to 100 mils. In some embodiments, the primer layer has a thickness of 40 mils to 100 mils. In some embodiments, the primer layer has a thickness of 50 mils to 100 mils. In some embodiments, the primer layer has a thickness of 60 mils to 100 mils. In some embodiments, the primer layer has a thickness of 70 mils to 100 mils. In some embodiments, the primer layer has a thickness of 80 mils to 100 mils. In some embodiments, the primer layer has a thickness of 90 mils to 100 mils.

In some embodiments, the method of installation 400 comprises removing 408 a release liner from the roofing membrane, so as to expose an adhesive layer.

In some embodiments, the removing 408 comprises peeling the release liner from the roofing membrane. In some embodiments, the removing 408 comprises pulling the release liner off the roofing membrane. In some embodiments, the removing 408 comprises detaching the release liner from the roofing membrane. In some embodiments, the removing 408 comprises decoupling the release liner from the roofing membrane. In some embodiments, the removing 408 comprises separating the release liner from the roofing membrane. In some embodiments, the removing 408 comprises peeling the release liner from the adhesive layer of the roofing membrane. In some embodiments, the removing 408 comprises pulling the release liner off the adhesive layer of the roofing membrane. In some embodiments, the removing 408 comprises detaching the release liner from the adhesive layer of the roofing membrane. In some embodiments, the removing 408 comprises decoupling the release liner from the adhesive layer of the roofing membrane. In some embodiments, the removing 408 comprises separating the release liner from the adhesive layer of the roofing membrane.

In some embodiments, the method of installation 400 comprises applying 410 the adhesive layer to the primer layer, so as to adhere the roofing membrane to the roofing substrate.

In some embodiments, the applying 410 comprises adhering the roofing membrane to the primer layer. In some embodiments, the applying 410 comprises pressing the roofing membrane onto the primer layer. In some embodiments, the applying 410 comprises rolling the roofing membrane onto the primer layer. In some embodiments, the applying 410 comprises brushing the roofing membrane onto the primer layer. In some embodiments, the applying 410 comprises contacting the primer layer with the roofing membrane. In some embodiments, the applying 410 comprises contacting the primer layer with the adhesive layer of the roofing membrane. In some embodiments, the applying 410 comprises curing the adhesive of the adhesive layer. In some embodiments, for example, the applying 410 comprises at least one of exposing to moisture, irradiating with light, heating to a temperature sufficient to cure the adhesive of the adhesive layer, or any combination thereof. In some embodiments, for example, the applying 410 comprises at least one of exposing to moisture, irradiating with light, heating to a temperature sufficient to cure the primer layer, or any combination thereof. In some embodiments, the applying 410 comprises positioning the roofing membrane onto the primer layer. In some embodiments, the method of installation 400 comprises allowing the primer layer to at least partially dry ("flash off") prior to applying the adhesive layer to the primer layer.

Figure 5:
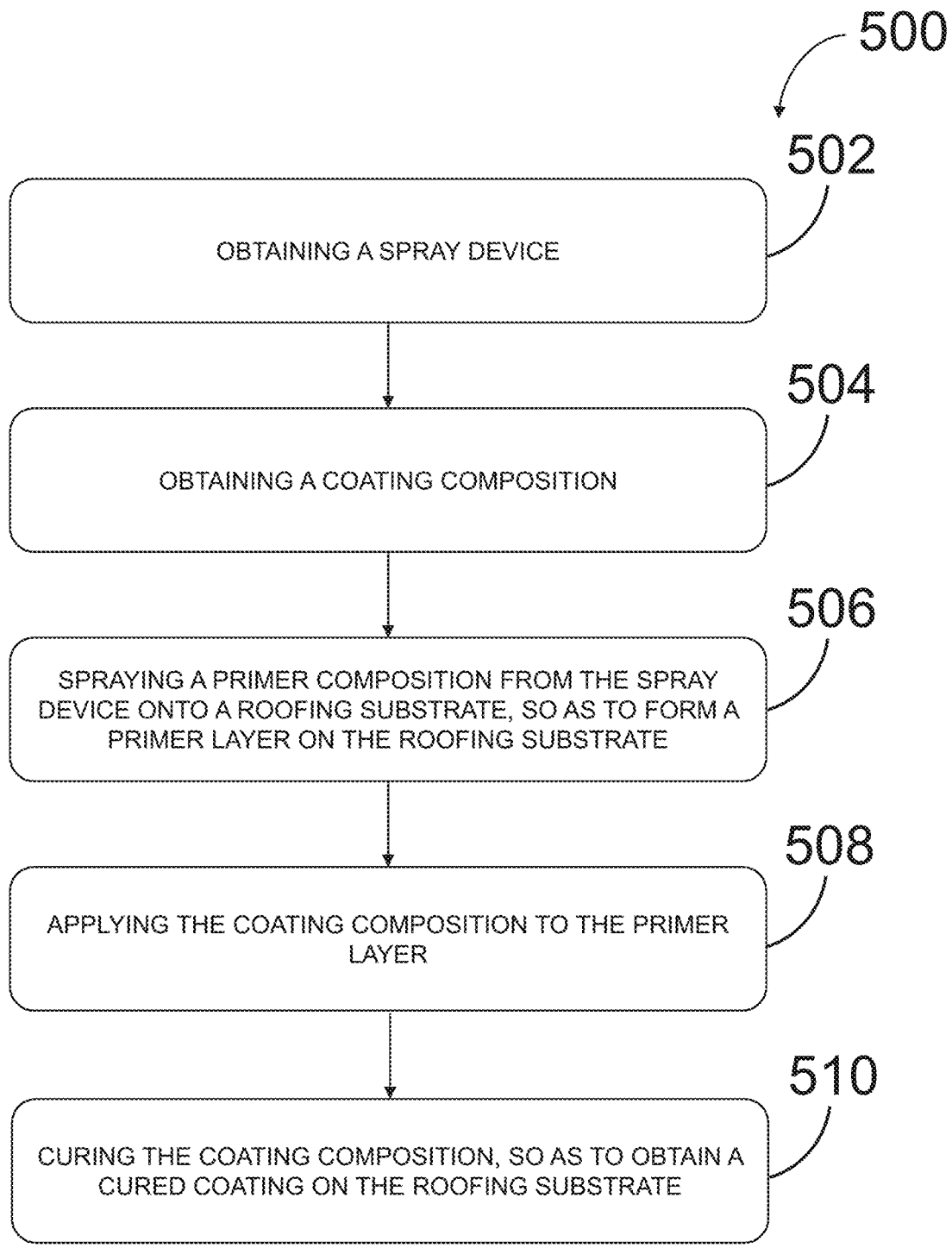

FIG. 5 is a flowchart of a method of installation 500, according to some embodiments. As shown in FIG. 5, in some embodiments, the method of installation 500 comprises one or more of the following steps: obtaining 502 a spray device; obtaining 504 a coating composition; spraying 506 a primer composition from the spray device onto a roofing substrate, so as to form a primer layer on the roofing substrate; applying 508 the coating composition to the primer layer, so as to obtain a coating composition on the roofing substrate; and curing 510 the coating composition so as to obtain a cured coating on the roofing substrate.

In some embodiments, the method of installation 500 comprises obtaining 502 a spray device.

Any one or more of the steps comprising obtaining the spray device disclosed herein may be used, without departing from the scope of this disclosure. For simplicity, the step of obtaining the spray device is not repeated here.

In some embodiments, the method of installation 500 comprises obtaining 504 a coating composition.

In some embodiments, the obtaining 504 comprises obtaining a coating composition comprising at least one of a polyurethane, a butyl, a polysiloxane (e.g., a silicone), a silyl-terminated polymer, a silyl-terminated polyurethane, a silyl-terminated polyether, a silyl-terminated acrylic, a silyl-terminated polyester, a hydroxyl-terminated polysiloxane, a hydroxyl-terminated polydimethylsiloxane, thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the coating composition further comprises at least one of at least one crosslinker, at least one catalyst, at least one filler, at least one colorant, at least one pigment, or any combination thereof.

In some embodiments, the coating composition is useful for forming an adhesive. In some embodiments, the coating composition is useful for forming a sealant. In some embodiments, the coating composition comprises a liquid applied membrane composition as disclosed herein.

In some embodiments, the method of installation 500 comprises spraying 506 a primer composition from the spray device onto a roofing substrate, so as to form a primer layer on the roofing substrate.

Any one or more of the spraying steps disclosed herein may be used, without departing from the scope of this disclosure. For simplicity, the spraying steps are not repeated here.

In some embodiments, the method of installation 500 comprises applying 508 the coating composition to the primer layer, so as to obtain a coating on the roofing substrate.

In some embodiments, the applying 508 the coating composition comprises rolling the coating composition onto the roofing substrate. In some embodiments, the applying 508 the coating composition comprises brushing the coating composition onto the roofing substrate. In some embodiments, the applying 508 the coating composition comprises spraying the coating composition onto the roofing substrate. In some embodiments, the applying 508 the coating composition comprises troweling the coating composition onto the roofing substrate. In some embodiments, the applying 508 the coating composition comprises pouring the coating composition onto the roofing substrate. In some embodiments, the applying 508 the coating composition comprises spreading the coating composition on the roofing substrate. In some embodiments, the applying 508 the coating composition comprises coating the roofing substrate with the coating composition. In some embodiments, the applying 508 is performed using at least one of a roller, a brush, a sprayer, a trowel, a coater, a similar tool, or any combination thereof. In some embodiments, for example, the applying 508 comprises at least one of exposing to moisture, irradiating with light, heating to a temperature sufficient to cure the primer layer, or any combination thereof. In some embodiments, the method of installation 500 comprises allowing the primer layer to at least partially dry ("flash off") prior to applying the coating composition to the primer layer.

In some embodiments, the applying 508 the coating composition comprises curing the coating composition to form a cured coating.

In some embodiments, the curing 510 the coating composition comprises exposing the coating composition to ambient conditions for a duration sufficient to at least partially cure the coating composition. In some embodiments, the curing 510 the coating composition comprises heating the coating composition to a temperature sufficient to at least partially cure the coating composition. In some embodiments, the curing 510 the coating composition comprises exposing the coating composition to water moisture sufficient to at least partially cure the coating composition. In some embodiments, the curing 510 the coating composition comprises exposing the coating composition to light (e.g., ultraviolet light, visible light, infrared light, etc.) sufficient to at least partially cure the coating composition.

In some embodiments, the curing 510 comprises curing the coating composition, so as to form an at least partially cured coating composition. In some embodiments, the curing 510 comprises curing the coating composition, so as to form an at least substantially cured coating composition. In some embodiments, the curing 510 comprises curing the coating composition, so as to form a fully cured coating composition. In some embodiments, the curing 510 proceeds under conditions sufficient to at least partially cure the coating composition. In some embodiments, the curing 510 proceeds under conditions sufficient to substantially cure the coating composition. In some embodiments, the curing 510 proceeds under conditions sufficient to completely cure the coating composition.

Figure 6:
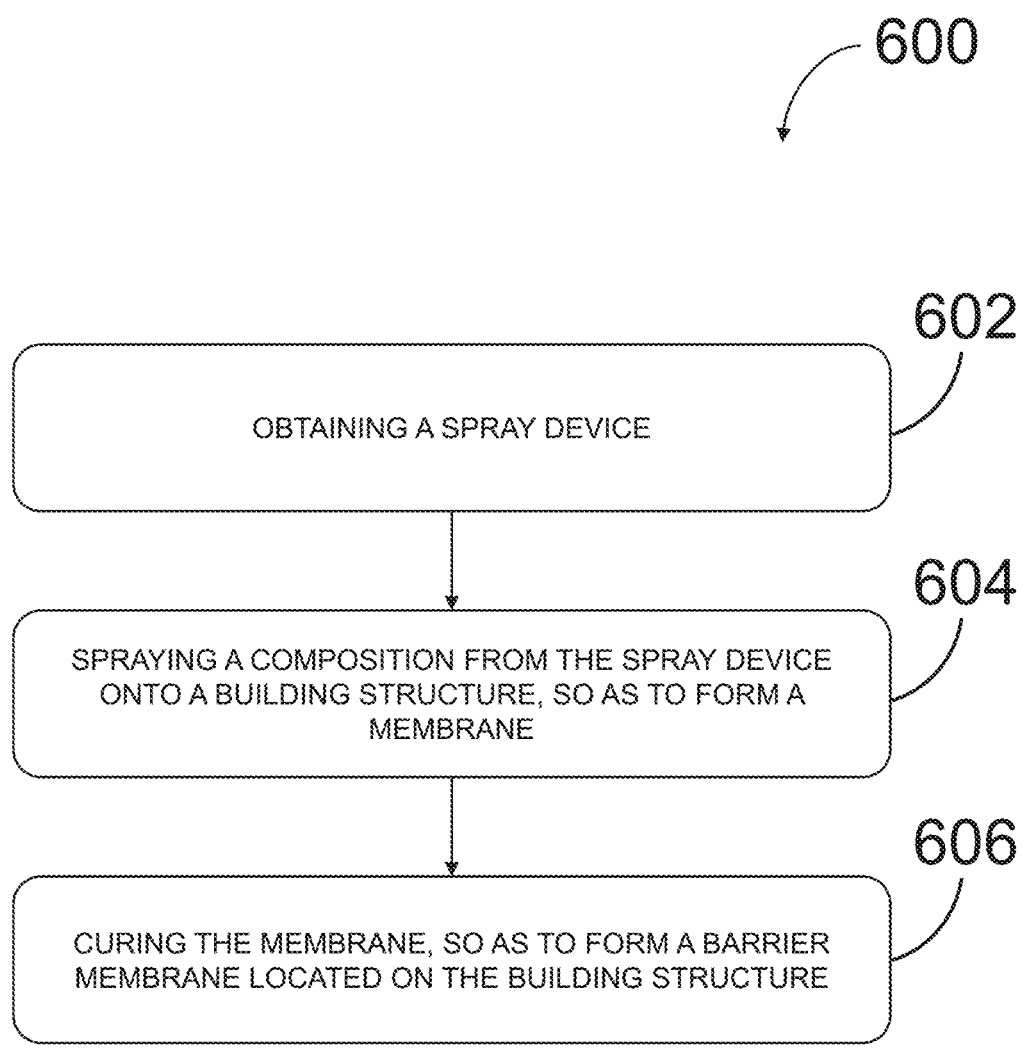

FIG. 6 is a flowchart of a method of installation 600, according to some embodiments. As shown in FIG. 6, in some embodiments, the method of installation 600 comprises one or more of the following steps: obtaining 602 a spray device; spraying 604 the composition from the spray device onto a building structure, so as to form a membrane; and curing 606 the membrane, so as to form a barrier membrane located on the building structure. It will be appreciated that any one or more of the steps for obtaining a spray device disclosed herein, the steps for spraying disclosed herein, and/or the steps for curing disclosed herein may be used without departing from the scope of this disclosure. It will further be appreciated that any one or more of the aerosilizable compositions disclosed herein may be used as the composition, without departing from the scope of this disclosure. For simplicity, the steps for obtaining a spray device disclosed herein, the steps for spraying disclosed herein, the steps for curing disclosed herein, and/or the aerosilizable compositions disclosed herein are not repeated here.

EXAMPLE

An aerosilizable composition was prepared with a low volatile organic compound (VOC) content and with a high solids content. The formulations for the aerosilizable composition are summarized in Table 1 below. Weight percentages are based on the total weight of the aerosilizable composition. A viscosity of the formulations presented in Table 1 was between 8,000 cP and 12,000 cP as measured according to ASTM D2196 using a Brookview viscometer at 20 rpm and 23° C.

| Component | Wt. % |
|---|---|
| Silyl-terminated polyether | 10% to 35% |
| Plasticizer | 10% to 25% |
| Solvent | 0.1% to 5% |
| Additives (Filler, Stabilizer, Pigment, Rheology Agent, Scavenger) | 25% to 60% |
| Crosslinker | <2% |
| Catalyst | <2% |
| Propellant | 35% |

The aerosilizable composition was sprayed from an aerosol container to form a barrier membrane spray film. The resulting barrier membrane spray film exhibited improved durability and bonding strength.

What is claimed is:

1. A system comprising:
a building structure;
a first membrane;
a second membrane,
wherein the first membrane and the second membrane are located on the building structure, such that the second membrane partially overlaps the first membrane in an overlapping portion;
wherein the second membrane is different from the first membrane; and
a cured barrier membrane spray film,
wherein the cured barrier membrane spray film is located between the first membrane and the second membrane in the overlapping portion;
wherein the cured barrier membrane spray film comprises at least one of a crosslinked silyl-terminated polymer, a crosslinked polysiloxane, or any combination thereof.

2. The system of claim 1, wherein the building structure is at least one of a wall assembly, a board, a siding, a sheet good, a panel, or any combination thereof.

3. The system of claim 1, wherein the first membrane is a liquid applied membrane.

4. The system of claim 3, wherein the liquid applied membrane comprises at least one of a polysiloxane, a polyurea, a polyurethane, a silyl-terminated polymer, an epoxy, an acrylic, a polyvinylidene fluoride, a polyvinylidene difluoride, any precursor thereof, any copolymer thereof, or any combination thereof.

5. The system of claim 1, wherein the second membrane comprises at least one of a thermoplastic polyolefin (TPO), a polyvinylchloride (PVC), an ethylene-propylene diene monomer (EPDM), a silyl-terminated polymer (STP), a polysiloxane, or any combination thereof.

6. The system of claim 1, wherein the cured barrier membrane spray film contacts, in the overlapping portion, the first membrane or the second membrane.

7. The system of claim 1, wherein the cured barrier membrane spray film contacts, in the overlapping portion, the first membrane and the second membrane.

8. The system of claim 1, wherein a thickness of the cured barrier membrane spray film is less than a thickness of the first membrane.

9. The system of claim 1, wherein the cured barrier membrane spray film forms a watertight seal located between the first membrane and the second membrane.

10. A system comprising:
a building structure;
a liquid applied membrane,
wherein the liquid applied membrane comprises at least one of a polysiloxane, a polyurea, a polyurethane, a silyl-terminated polymer, an epoxy, an acrylic, a polyvinylidene fluoride, a polyvinylidene difluoride, any precursor thereof, any copolymer thereof, or any combination thereof;
a second membrane,
wherein the liquid applied membrane and the second membrane are located on the building structure, such that the second membrane partially overlaps the liquid applied membrane in an overlapping portion; and
a cured barrier membrane spray film,
wherein the cured barrier membrane spray film is located between the liquid applied membrane and the second membrane in the overlapping portion;
wherein the cured barrier membrane spray film comprises at least one of a crosslinked silyl-terminated polymer, a crosslinked polysiloxane, or any combination thereof.

11. The system of claim 10, wherein the building structure is at least one of a wall assembly, a board, a siding, a sheet good, a panel, or any combination thereof.

12. The system of claim 10, wherein the second membrane is different from the liquid applied membrane.

13. The system of claim 12, wherein the second membrane comprises at least one of a thermoplastic polyolefin (TPO), a polyvinylchloride (PVC), an ethylene-propylene diene monomer (EPDM), a silyl-terminated polymer (STP), a polysiloxane, or any combination thereof.

14. The system of claim 10, wherein the cured barrier membrane spray film contacts, in the overlapping portion, the liquid applied membrane or the second membrane.

15. A system comprising:
a building structure;
a first membrane;
a second membrane,
wherein the first membrane and the second membrane are located on the building structure, such that the second membrane partially overlaps the first membrane in an overlapping portion;
wherein the second membrane comprises at least one of a thermoplastic polyolefin (TPO), a polyvinylchloride (PVC), an ethylene-propylene diene monomer (EPDM), a silyl-terminated polymer (STP), a polysiloxane, or any combination thereof; and
a cured barrier membrane spray film,
wherein the cured barrier membrane spray film is located between the first membrane and the second membrane in the overlapping portion;
wherein the cured barrier membrane spray film comprises at least one of a crosslinked silyl-terminated polymer, a crosslinked polysiloxane, or any combination thereof.

16. The system of claim 15, wherein the building structure is at least one of a wall assembly, a board, a siding, a sheet good, a panel, or any combination thereof.

17. The system of claim 15, wherein the first membrane is a liquid applied membrane.

18. The system of claim 17, wherein the liquid applied membrane comprises at least one of a polysiloxane, a polyurea, a polyurethane, a silyl-terminated polymer, an epoxy, an acrylic, a polyvinylidene fluoride, a polyvinylidene difluoride, any precursor thereof, any copolymer thereof, or any combination thereof.

19. The system of claim 15, wherein the cured barrier membrane spray film contacts, in the overlapping portion, the first membrane or the second membrane.

\* \* \* \* \*